(12) United States Patent
Machida et al.

(10) Patent No.: US 7,584,427 B2
(45) Date of Patent: Sep. 1, 2009

(54) OPERATING METHOD AND DEVICE, AND IMAGE PROCESSING APPARATUS USING THE SAME

(75) Inventors: Masahiro Machida, Ebina (JP); Tatsuhiko Saitoh, Ebina (JP)

(73) Assignee: Fuji Xerox Co., Ltd., Tokyo (JP)

( * ) Notice: Subject to any disclaimer, the term of this patent is extended or adjusted under 35 U.S.C. 154(b) by 578 days.

(21) Appl. No.: 09/810,534

(22) Filed: Mar. 19, 2001

(65) Prior Publication Data

US 2001/0026290 A1   Oct. 4, 2001

(30) Foreign Application Priority Data

Mar. 24, 2000  (JP)  ............................. 2000-084974
Mar. 24, 2000  (JP)  ............................. 2000-085025

(51) Int. Cl.
  *G06F 3/00* (2006.01)
(52) U.S. Cl. ...................... 715/713; 715/708; 715/828; 715/829
(58) Field of Classification Search ................ 345/708, 345/713, 828, 829, 818
See application file for complete search history.

(56) References Cited

U.S. PATENT DOCUMENTS

| 5,543,857 | A | * | 8/1996 | Wehmeyer et al. .......... 348/589 |
| 5,751,953 | A | * | 5/1998 | Shiels et al. ................ 345/720 |
| 5,781,247 | A | * | 7/1998 | Wehmeyer et al. .......... 348/569 |
| 5,845,124 | A | * | 12/1998 | Berman ........................ 703/2 |
| 6,067,084 | A | * | 5/2000 | Fado et al. ................... 345/708 |
| 6,115,720 | A | * | 9/2000 | Bleizeffer et al. ............ 707/201 |
| 6,181,893 | B1 | * | 1/2001 | Collard et al. ................ 399/80 |
| 6,603,488 | B2 | * | 8/2003 | Humpleman et al. ........ 345/771 |
| 6,661,437 | B1 | * | 12/2003 | Miller et al. ................ 345/810 |

FOREIGN PATENT DOCUMENTS

| JP | A-4-233591 | 8/1992 |
| JP | A 9-114902 | 5/1997 |
| JP | A-9-179698 | 7/1997 |
| JP | A-9-244843 | 9/1997 |

\* cited by examiner

*Primary Examiner*—Simon Ke
(74) *Attorney, Agent, or Firm*—Oliff & Berridge, PLC

(57) ABSTRACT

In menu operating method and device and an image processing apparatus using the same, a setting frame for operating a setting menu is constructed by a setting menu display area and a hierarchical menu display area. A setting menu to be operated is displayed in the setting menu display area, and menu item buttons corresponding to setting menus on respective layers contained in a hierarchical menu are displayed in a listing style according to its hierarchical structure in the hierarchical menu display area. At this time, an operator can obtain information such as the hierarchical structure of menus and the position of a setting menu being operated on each setting frame, and the operability of the hierarchical menu is enhanced.

9 Claims, 20 Drawing Sheets

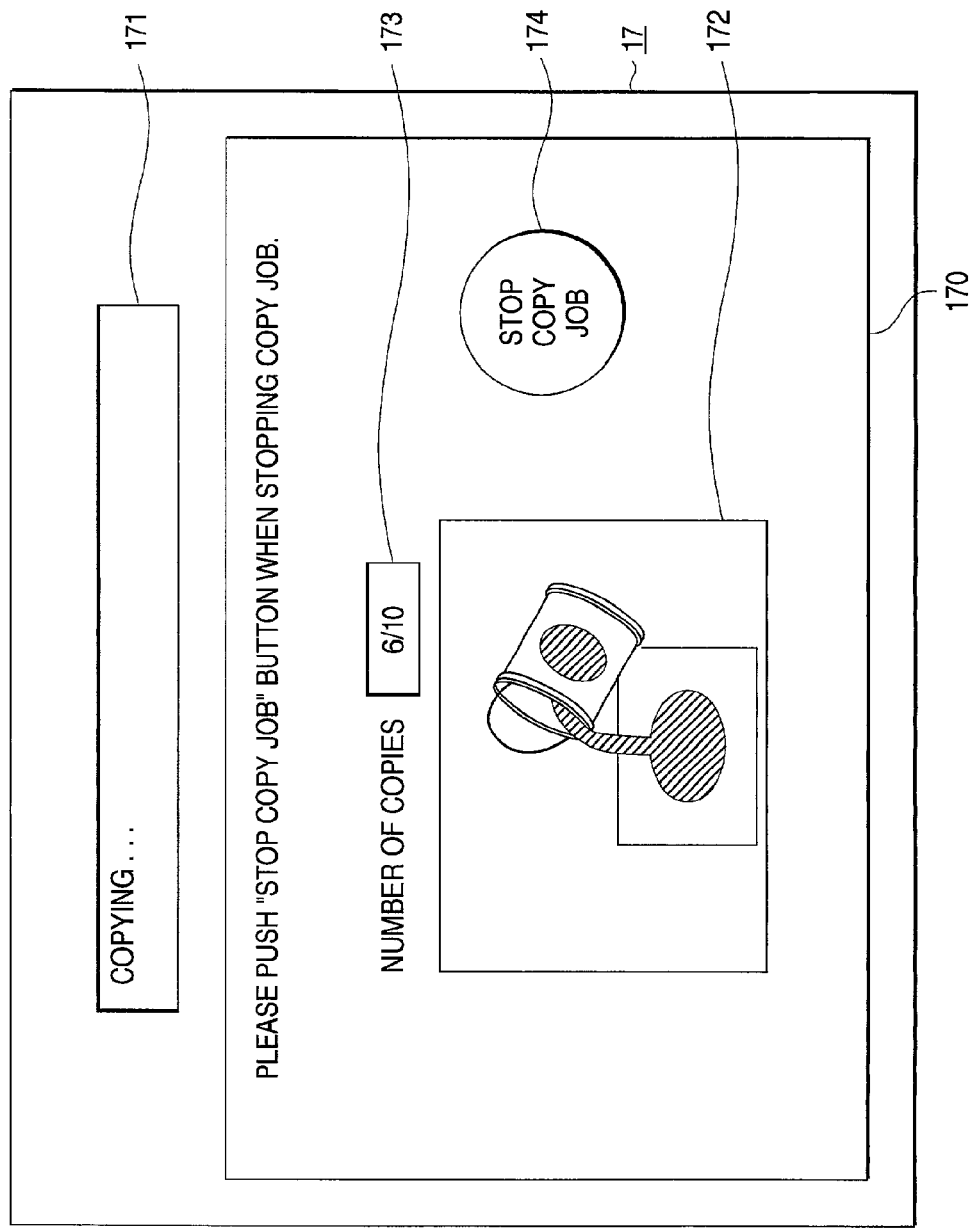

OPERATING METHOD AND DEVICE, AND IMAGE PROCESSING APPARATUS USING THE SAME

BACKGROUND OF THE INVENTION

1. Field of the Invention

The present invention relates to sequential setting type operating method and device, and an image processing apparatus using the same.

2. Description of the Related Art

As a sequential setting type (modal type) user interface has been known a menu operating system which is used in an apparatus for setting operating parameters such as the type of copy job processing, the sheet size, etc. in an image processing apparatus such as a copying machine or the like, ATMs (Automatic Teller Machines) of banks, ticket-vending machines of transit systems and various information terminals. In order for an operator to set plural parameters required to set the type of an operation to be performed and specify the operating condition thereof, a hierarchical menu having a hierarchical structure including plural setting menus is used in the above system (see Japanese Patent Laid-open No. Hei-9-114902).

Each setting menu contains setting items (parameter name, etc.) indicating parameters which the operator is allowed to set, and alternatives of the values of the parameters which can be set for the setting items. In the menu operating device, a setting display frame for each setting menu is created and displayed on a display device to indicate the information on the setting items and the parameter values to the operator. According to indications of the setting frames thus displayed, the operator sequentially inputs and sets the parameter value for each setting item. When the setting of all the parameter values required to carry out the processing operation is completed for the setting menu of each layer contained in the hierarchical menu, the processing operation is started according to the processing type and the operating condition which are specified on the basis of each set parameter value.

In the sequential setting type menu operation using the hierarchical menu as described above, there is a case where an operator wants to alter or check some parameter values which have been set (hereinafter referred to as "set parameter values") by the operator in setting menus which have been already operated, thereby resetting parameter values. In this case, the operator sequentially turns the setting frame back from the current displayed setting frame one by one by using a one-frame turn-back button until the setting frame reaches a desired setting frame, or returns the setting frame to the initial setting (initialized) frame by using a initial return button and then turns the setting frame forwardly one by one until the setting frame reaches a desired setting frame.

In the case where the setting menu which has been already operated is re-operated as described above, particularly when the number of layers of the hierarchical structure of the setting menu is large, the number of operating steps required to return the setting frame to a desired setting frame for which the parameter values are to be altered or checked is increased. Further, the operator does not know any information on the number of setting menus and parameter values to be operated, the location of a setting menu being operated in the hierarchical structure of the overall hierarchical menu, etc. Therefore, the procedure of the various menu operations containing the alteration or check of the parameters is complicated, resulting in lowering of operability and also execution of an erroneous processing operation due to erroneous setting of parameters.

SUMMARY OF THE INVENTION

The present invention has been made in view of the above circumstances and provides operating method and device which can enhance the operability when plural items are sequentially set, and an image processing apparatus using the operating method and device.

According to a first aspect of the present invention, an operating method for sequentially performing settings for plural items in predetermined order includes the steps of sequentially displaying plural setting frames which are provided to the plural items respectively, and displaying the plural items when one of the plural setting frames is displayed.

According to a second aspect of the present invention, in the operating method of the first aspect, items which have been already set, items being set and items which have not yet been set are displayed so as to be distinguishable from one another.

According to a third aspect of the present invention, in the operating method of the first aspect of the present invention, values which have been set are displayed for the items which have been already set.

According to a fourth aspect of the present invention, in the operating method of the first aspect, an operation of displaying a setting frame for an item which has been already set is allowed to be carried out when one of the plural setting frames is displayed.

According to a fifth aspect of the present invention, in the operating method of the fourth aspect, a setting frame for an item which has been already set is displayed, and after the setting for the item is carried out, the setting frame is automatically restored to a setting frame displayed just before the setting frame for the item which has been already set is displayed.

According to a sixth aspect of the present invention, in the operating method of the fifth aspect, when the setting frame is restored to the previous setting frame, a previously set state is held.

According to a seventh aspect of the present invention, an operating device for sequentially performing settings for plural items in predetermined order includes a storage unit for storing plural setting frames provided to the respective plural items, and a controller for displaying the plural items when one of the plural setting frames is displayed.

According to an eighth aspect of the present invention, in the operating device of the seventh aspect, items which have been already set, items being set and items which have not yet been set are displayed so as to be discriminable from one another.

According to a ninth aspect of the present invention, in the operating device of the seventh aspect of the present invention, values which have been set are displayed for the items which have been already set.

According to a tenth aspect of the present invention, in the operating device of the seventh aspect, an operation of displaying a setting frame for an item which has been already set is allowed to be carried out when one of the plural setting frames is displayed.

According to an eleventh aspect of the present invention, in the operating device of the seventh aspect, a setting frame for an item which has been already set is displayed, and after the settings for the items are carried out, the setting frame is automatically restored to a previous setting frame displayed before the setting frame for the items which have been already set is displayed.

According to a twelfth aspect of the present invention, in the operating method of the fifth aspect, when the setting frame is restored to the previous setting frame, a previously set state is held.

According to a thirteenth aspect of the present invention, an image processing apparatus having an operating device for sequentially performing settings for plural items in predetermined order includes a storage unit for storing plural setting frames provided to the respective plural items, and a controller for displaying the plural items when one of the plural setting frames is displayed.

According to a fourteenth aspect of the present invention, in an operating method for sequentially performing settings for plural items in predetermined order to perform settings for a processor, after the processing operation of the processor is carried out on the basis of the contents set for the plural items, the contents set for the plural items are held.

It is preferable that when the contents set for the plural items are held after the processing operation of the processor is carried out, a processing start frame displayed after all the settings for the plural items are carried out is not used, but the setting frame is returned to the last setting frame to check the setting contents for the plural items.

Further, when the contents set for the plural items are held after the processing operation of the processor is executed, in order to enable alteration of some of the contents which have been already set, the setting frame is preferably returned to a setting frame for an item to be altered.

According to a fifteenth aspect of the present invention, in the operating method of the fourteenth aspect, after the processing operation of the processor is executed, it can be indicated whether the contents set for the plural items are held or the set contents are cleared.

According to a sixteenth aspect of the present invention, in an operating method for sequentially performing settings for plural items in predetermined order to perform the setting for a processor, an instructing unit for initializing all the settings for the plural items is allowed to be operated.

When the instructing unit for initializing all the settings for the plural items is operated, it is preferable to display a processing start frame which is a display frame to be displayed after all the settings for the plural items are executed. Further, in order to enable alteration from the initial setting to another setting for some of the plural items when the instructing unit for initializing all the settings for the plural items is operated, it is preferable to display each setting frame and enable re-setting.

According to a seventeenth aspect of the present invention, in the operating method of the sixteenth aspect, the instructing unit is displayed on an initial frame.

According to an eighteenth aspect of the present invention, an operating device for sequentially performing settings for plural items in predetermined order to perform settings for a processor includes a holding unit for holding the contents set for the plural items after the processing operation of the processor is carried out on the basis of the contents set for the plural items.

According to a nineteenth aspect of the present invention, the operating device of the eighteenth aspect includes an instructing unit for making an instruction as to whether the contents set for the plural items are held or the set contents are cleared after the processing operation of the processor is executed.

According to a twentieth aspect of the present invention, an operating device for sequentially performing settings for plural items in predetermined order to perform settings for a processor, includes an instructing unit for initializing all the settings for the plural items.

According to a twenty-first aspect of the present invention, in the operating device of the twentieth aspect, the instructing unit is displayed on an initial frame.

According to a twenty-second aspect of the present invention, an image processing apparatus having an operating device for sequentially performing settings for plural items in predetermined order to perform the setting for a processor includes a holding unit for holding the contents set for the plural items after the processing operation of the image processing apparatus is executed on the basis of the contents set for the plural items.

The operating method and the operating device of the present invention are applicable to not only an image processing apparatus such as a copying machine or the like, but also various processors such as ATMs (Automatic Teller Machines) of banks, ticket-vending machines of transit systems and various information terminals.

BRIEF DESCRIPTION OF THE DRAWINGS

Preferred embodiments of the present invention will be described in detail based on the following figures, wherein:

FIG. 20 is a diagram showing another configuration of the processing executing frame.

DETAILED DESCRIPTION OF THE PREFERRED EMBODIMENTS

Figure 1:
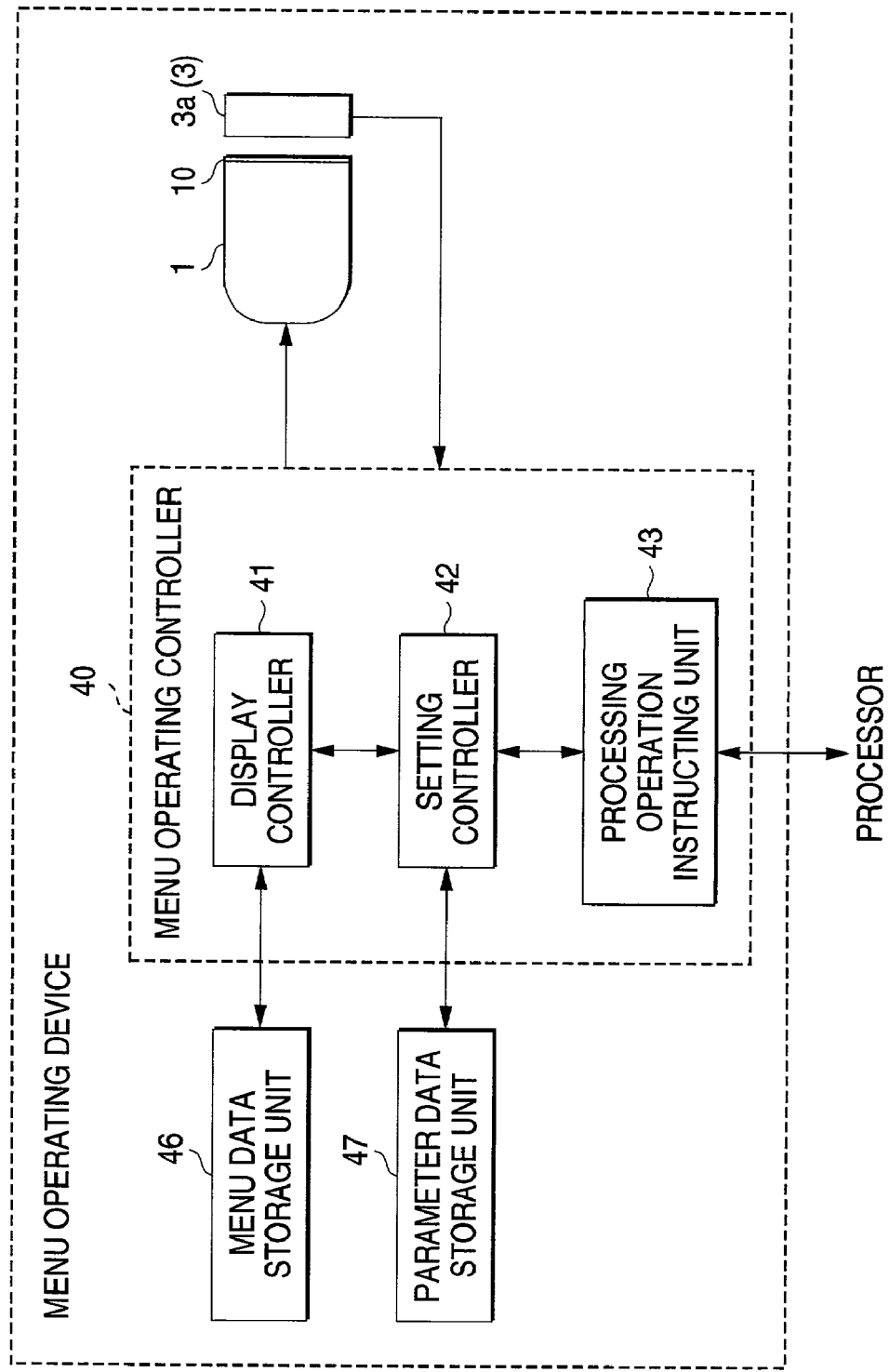
FIG. 1 is a block diagram showing the configuration of an embodiment of a menu operating device.

Preferred embodiments according to a menu operating method, a menu operating device and an image processing apparatus using the same in the present invention will be described hereunder with reference to the accompanying drawings. In the following description, the same elements are represented by the same reference numerals, and the duplicative description thereof is omitted. Further, the dimensional ratio of the elements in the figures is not necessarily coincident with that of the elements described in the following description.

FIG. 1 is a block diagram showing the configuration of an embodiment of a menu operating device according to the present invention.

The menu operating device uses a hierarchical menu which is constructed to have a hierarchical structure including plural setting menus. In the menu operating device, the setting menus of the respective layers in the hierarchical structure are sequentially operated along the hierarchical structure to sequentially set parameters for setting items required to execute a desired processing operation. The operating device is constructed to have a display device 1 for displaying a setting frame to operate a setting menu, a frame for a processing operation, etc., an input device 3 for operating a setting menu or instructing other operations while referring to the display content of the setting menu thus displayed or the like, and a menu operating controller 40 for controlling the menu operation using the above units.

A liquid crystal display or a CRT display is used as the display device 1, and the setting frame, etc. are displayed on the screen 10 of the display device 1. The input device 3 is equipped with a touch panel 3a which is mounted so as to face the screen 10 of the display device 1 as shown in FIG. 1. In addition to the tough panel 3a, a pointing device such as a mouse or the like or a keyboard or operating panel including ten keys and various instructing buttons may be used as the input device 3.

The menu operating controller 40 includes a display controller 41 for sequentially creating setting frames or other display frames (a processing start frame, a processing executing frame, a processing end frame, etc. as described later) and displaying these frames on the screen 10 of the display device 1, and a setting controller 42 for performing setting of parameters, etc. on the basis of the parameter values input from the touch panel 3a serving as the input device 3 and other operating instruction information.

The display controller 41 refers to menu data stored in a menu data storage unit 46 to create the setting frame corresponding to each setting menu, display frames for processing operations, etc. The menu data contain information on the setting item name (parameter name) of each setting menu, the hierarchical structure of the menu, the constructing method of each frame, and character data and image data required to create the setting frames, etc.

The setting controller 42 sets parameters for setting items in each setting menu by referring to the parameter data stored in the parameter data storage unit 47 if occasion demands. Further, the setting controller 42 may make an instruction to the display controller 41 about a setting menu to be next operated and a setting frame to be next displayed on the basis of the result of setting parameters. The parameter data contain information on the initial values of the parameters or data of default values. However, these parameter data are not necessarily required to be referred to if the setting can be performed on the basis of only the parameter values input from the touch panel 3a (input device 3).

When the parameter setting is completed for all the setting items required to execute the processing operation, an instruction on the processing operation, for example, an instruction of indicating operating parameters or an instruction of starting execution of the processing operation is made to the processor through a processing operation instructing unit 43. The menu operating device thus constructed may be affixed to or contained as a part of the processor for executing the processing operation, which serves as a target to be subjected to the parameter setting based on the hierarchical menu.

Figure 2:
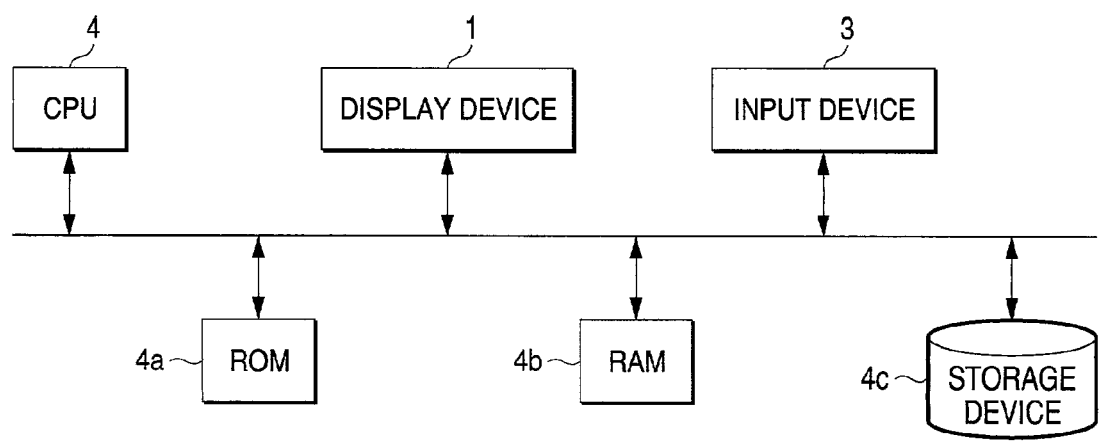
FIG. 2 is a block diagram showing a hardware configuration used for the menu operating device shown in FIG. 1.

FIG. 2 is a block diagram showing a hardware configuration used for the menu operating device shown in FIG. 1. The hardware control functions of the respective parts of the menu operating device and the software control functions such as menu display and operation based on the menu operating controller 40 are carried out by CPU 4. CPU 4 is connected to ROM 4a in which software programs, etc. required to execute the operation of the operating device are stored, and RAM 4b formed of DRAM or the like in which data are temporarily stored during execution of the programs.

The display device 1 for displaying each display frame such as the setting frame or the like and the input device 3 such as the touch panel 3a for inputting the parameter values according to a setting menu displayed on a setting frame are connected to CPU 4, ROM 4a and RAM 4b to thereby construct the menu operating device. Further, an external storage device 4c constructed by a single or plural storage devices such as hard discs or the like is used as the menu data storage unit 46 for storing the menu data and the parameter data storage unit 47 for storing the parameter data.

Next, embodiments of the hierarchical menu, the setting menus contained in the hierarchical menu, and the display frames containing the setting frames which are created and displayed in association with the setting menu with respect to the menu operation method in the menu operating apparatus shown in FIG. 1 will be described. These embodiments will be described by using such a case that the menu operating apparatus is applied to an image processing apparatus, particularly a copying machine having a copying function or a composite machine having both of a copying function and other functions.

Figure 3:
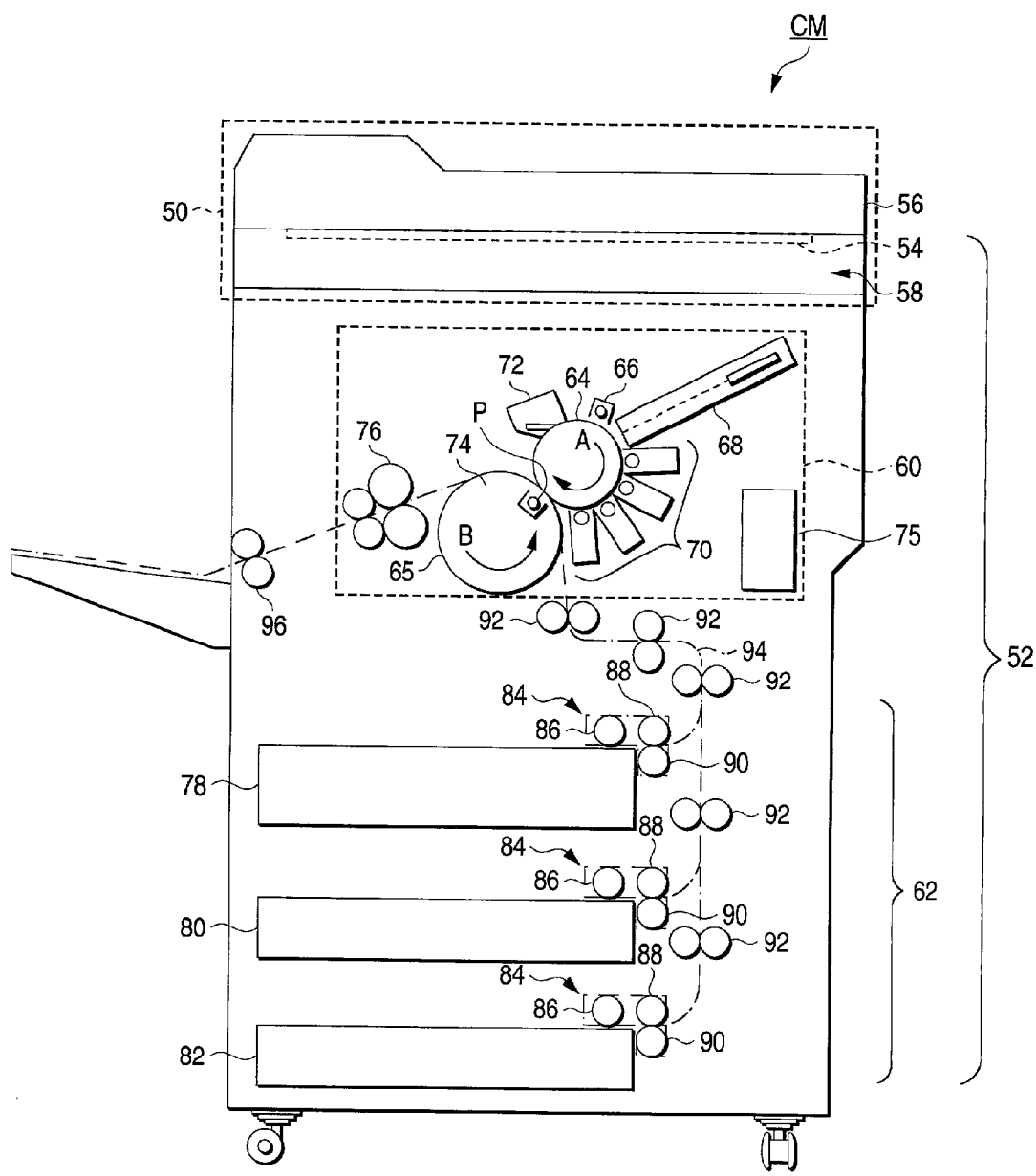
FIG. 3 is a diagram showing the basic configuration of a copying machine which is an embodiment of an image processing apparatus to which the menu operating device is applied.

First, the configuration of a copying machine (or composite machine) which is an embodiment of the image processing apparatus will be schematically described. FIG. 3 shows the basic configuration of the copying machine to which the menu operating method and the menu operating device of the present invention are applied.

The copying machine CM shown in FIG. 3 is equipped with a main body 52, and an automatic original (source document) feeding unit 56 disposed so that a platen glass 54 mounted on the top face of the main body 52 is freely exposed to the outside and covered by the automatic original feeding unit 56. The platen glass 54, the automatic original feeding unit 56 and an original reading unit 58 constitute an image reading unit 50 for reading an image.

In the main body 52 are disposed the original reading unit 58 for reading an image of an original which is fed onto the platen glass 54 by the automatic original feeding unit 56 or an image of a fixed original which is mounted on the platen glass 54 by opening the automatic original feeding unit 56, and converting the image thus read to image data, an image forming unit 60 for forming a visible image on a recording sheet (recording member) on the basis of the image data received from the image reading unit 50, and a sheet supply unit 62 for supplying a recording sheet to the image forming unit 60.

The image forming unit 60 is equipped with a photosensitive drum 64 (image carrier) rotating in a direction A (clockwise direction) of FIG. 3 and a transfer roll 65 rotating in a direction B (counterclockwise direction) of FIG. 3 so that the photosensitive drum 64 and the transfer roll 65 are proximate to each other at a transfer position P.

Around the photosensitive drum 64 are disposed an electrifying unit 66 for uniformly electrifying the photosensitive drum 64, a writing unit 68 for driving a laser beam or the like on the basis of the image data received from the image reading unit 50 to form an electrostatic latent image on the surface of the photosensitive drum 64, four developing units 70 each of which visualizes an electrostatic latent image formed on the photosensitive drum 64 with each of four color toner materials of yellow, magenta, cyan and black to form a developed image, and a cleaning unit 72 for removing residual toner on the photosensitive drum 64 after the developing image is transferred from the photosensitive drum 64 to the transfer roll 65 at the transfer position P.

In this embodiment, the four developing units 70 are mounted as described above, whereby the copying machine CM is constructed as an image processing apparatus which has a color copy function and can perform plural image forming types. The number of the developing units 70 used to form an image on a recording sheet is suitably determined on the basis of the number of toner materials being used in accordance with the image forming (copy job) type such as full color, white and black, monochromatic color or the like.

A transfer machine 74 for transferring a developing image formed with toner on the surface of the photosensitive drum 64 onto a recording sheet which is supplied from the sheet supply unit 62 and fed into the gap between the photosensitive drum 64 and the transfer roll 65 is disposed inside the transfer roll 65 so as to face the transfer position P.

The image forming unit 60 is equipped with an image forming controller 75, and the electrifying unit 66, the writing unit 68 and the developing units 70 are controlled by the image forming controller 75 to control the amount of toner adhering onto the surface of the photosensitive drum 64. Further, the image forming unit 60 is equipped to a fixing unit 76 with which a developed toner image transferred to a recording sheet by the transfer machine 74 is fixed to the sheet.

The sheet supply unit 62 for supplying the sheet to the image forming unit 60 is disposed at the lower portion of the main body 52, and equipped with three sheet supply trays 78, 80, 82 each serving as a sheet supply unit, and a sheet supply mechanism 84 which is provided to each of the sheet supply trays 78, 80, 82. Recording sheets on which images will be formed are stacked in each of the sheet supply trays 78, 80, 82 while sorted in accordance with the sheet size or sheet type, and sequentially supplied to the transfer roll 65. Each sheet supply tray is detachably mounted in the main body 52, and a recording sheet is supplied from any one of these sheet supply trays.

Each sheet supply mechanism 84 includes a pickup roller 86 which abuts against the recording sheet located at the uppermost position in the sheet supply trays 78, 80, 82 and sequentially feeds the sheet out, and a feed roller 88 and a retard roller 90 which are paired rollers for receiving the sheet fed out from the pickup roller 86 and feeding out the sheet toward the image forming unit 60 while preventing overlapped sheets from being fed out. The pickup roller 86 and the feed roller 88 are rotated by a motor (not shown), and the retard roller 90 paired with the feed roller 88 is rotationally driven by the rotation of the feed roller 88.

A recording sheet feeding path 94 is constructed by plural pairs of guide rollers 92 in a path extending from each sheet tray 78, 80, 82 toward the image forming unit 60. Recording sheets fed out from each sheet supply tray 78, 80, 82 are sequentially fed to the transfer position P and further the fixing unit 76 along the recording sheet feeding path 94, and then discharged to the outside through a discharge roller 96 disposed at the downstream side of the fixing unit 76 after the image forming process is carried out.

With respect to the image formation in the image forming unit 60, when an original is copied, the image formation is carried out on the basis of the image data from the image reading unit 50 as described above. When the image processing apparatus is a composite machine, the image forming unit 60 likewise forms an image on a recording sheet on the basis of image data from an external device such as a personal computer or the like which is connected to the image processing apparatus or image data read out from a recording medium such as a floppy disk or the like, in addition to image data from the image reading unit 50.

Next, an embodiment of the menu operating method when the menu operating device shown in FIG. 1 is applied to the copying machine or composite machine shown in FIG. 3 will be described. With respect to the mount position of the menu operating device, it may be affixed to the outside of the copying machine, however, it is preferable that the menu operating device is integrally mounted in the copying machine (not shown in FIG. 3). In this case, CPU 4, ROM 4a, RAM 4b, the external storage device 4c, etc constituting the menu operating controller 40, etc. are mounted as the menu operating controller at predetermined positions in the copying machine, and the display unit 1 and the input device 3 such as the touch panel 3a are mounted as a part of the operating panel of the copying machine.

Here, in the following description on each display frame, the touch panel 3a is mounted on the screen 10 of the display device 1, and in association with this arrangement, each of portions which functions as an input portion used to select a setting menu or input a parameter in each display portion or display area on a display frame is expressed by "button", thereby discriminating these portions from those portions used to merely display information.

The hierarchical menu of this embodiment is used to set parameters of plural setting items on the processing type and operating condition of a copying operation which is a predetermined processing operation, and it is constructed by five setting menus of (1) a copy job type setting menu, (2) a sheet size setting menu, (3) a magnification setting menu, (4) a number-of-copies setting menu and (5) other setting menus.

These setting menus constitute the hierarchical menu for sequentially setting the parameters for the respective setting items by the hierarchical structure which is constructed in order from (1) to (5). The setting menu (1) is used for the processing type, and the setting menus (2) to (5) are used to set the operation conditions. This hierarchical menu is not designed in such a tree structure that the operating flow of setting menus is branched.

Figure 4:
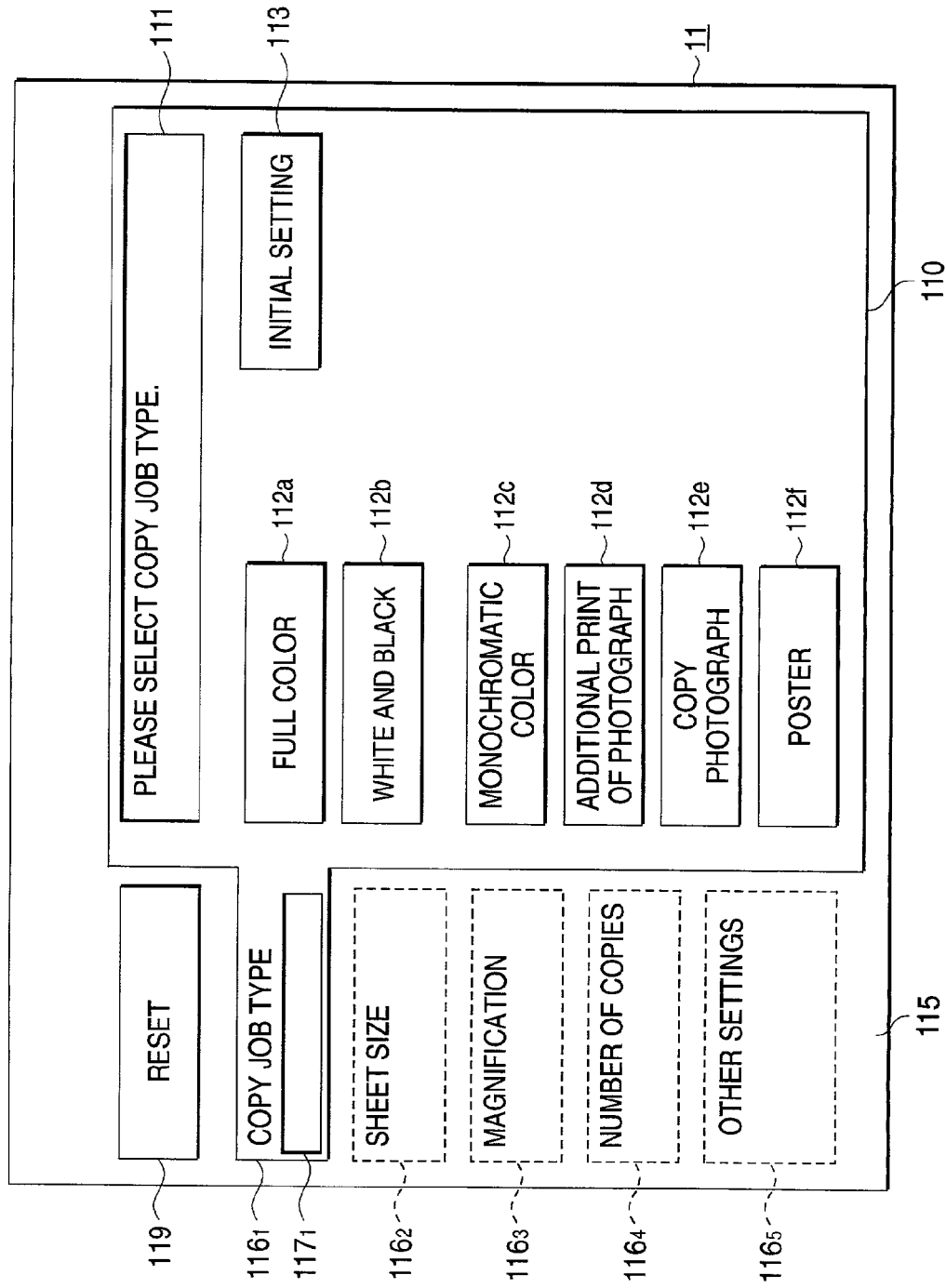
FIG. 4 is a diagram showing a configuration of a copy job type setting frame which is a first setting frame.

FIG. 4 is a diagram showing a copy job type setting frame 11 which is a first setting frame of this embodiment. The type setting frame 11 is designed to have a setting menu display area 110 which is located at the right side of the frame and displays the copy job type setting menu, and a hierarchical menu display area 115 which is located at the left side of the frame and displays the hierarchical structure of the hierarchical menu constructed by five setting menus. At the upper left side of the frame (above the hierarchical menu display area 115) is disposed a reset button 119 for clearing and resetting the parameter values set for setting items in each setting menu.

The type setting menus to be operated on the type setting frame 11 are displayed in the setting menu display area 110. An instruction content display window 111 is provided at the upper portion of the setting menu display area 110, and "copy job type" which is the setting item name (parameter name) in this setting menu is displayed in the instruction content display window 111 to indicate selection of a parameter value to a user. Below the instruction content display window 111 are disposed six parameter input buttons 112a to 112f which indicate the choices of the parameter values settable for this setting item and with which the parameters are input through the touch panel 3a.

In the hierarchical menu display area 115 is displayed a list of five menu item buttons $116_1$ to $116_5$ corresponding to the setting menus of the five layers which contain the type setting menu displayed in the setting menu display area 110 in the type setting frame 11.

The setting item names "copy job type", "sheet size", "magnification", "number-of-copies" and "other settings" corresponding to the respective setting menus are displayed to indicate the association with the setting menus of the five layers on the menu item buttons $116_1$ to $116_5$. These five menu item buttons $116_1$ to $116_5$ are arranged from the upper side to the lower side of the frame in this order.

At this time, the menu item buttons $116_1$ to $116_5$ are displayed in such a listed arrangement that the setting menu corresponding to the menu item button $116_1$ displayed at the uppermost position in the hierarchical menu display area 115 is set as the top-end type setting menu (the setting menu which is first operated) in the hierarchical structure of the hierarchical menu, and the menu item buttons $116_2$ to $116_5$ corresponding to the lower setting menus (the setting menus which are subsequently operated) are displayed in the hierarchical order downwardly from the menu item button $116_1$.

The "copy job type" menu item button $116_1$ located at the first place (top) out of the menu item buttons $116_1$ to $116_5$ is displayed in the setting menu display area 110 on the setting frame 11, and it is the menu item corresponding to the type setting menu under operation (whose parameter is currently being set). Therefore, the menu item button $116_1$ is displayed so that the right end portion thereof is connected to the setting menu display area 110 adjacent to the right side of the menu item button $116_1$ as if it is displayed as a tag of the setting menu display area 110.

A parameter display window $117_1$ for indicating a parameter value to be selected as a copy job type in the type setting menu is provided below the setting item name "copy job type" in the menu item button $116_1$ being set. However, at the time when the type setting frame 11 is operated, no parameter value is displayed in the parameter display window $117_1$ because a parameter value indicating the copy job type has not yet been set, and thus it indicates that the parameter setting is being carried out.

Further, the second to fifth menu item buttons $116_2$ to $116_5$ other than the menu item button $116_1$ being set have not been operated until this time, and thus they are the menu items corresponding to the setting menus on which any parameter has not yet been set. Therefore, as indicated by dotted lines of FIG. 4, the non-set menu item buttons $116_2$ to $116_5$ are displayed in a display style different from that of the menu item button $116_1$ being set. Further, no parameter display window is provided in each of the menu item buttons $116_2$ to $116_5$.

When any one of the parameter input buttons 112a to 112f for indicating parameter values "full color", "white and black", "monochromatic color", "additional print of photograph", "copy of photograph" and "poster" which can be set for the setting item "copy job type" of the type setting menu, for example, the parameter input button 112a for selecting "full color" is pushed through the touch panel 3a in the type setting frame 11 (first setting frame) thus constructed, the parameter value corresponding to the parameter input button thus pushed is set as a parameter of "copy job type" in the setting controller 42 of the menu operating controller 40. In this case, a second setting frame is created in the display controller 41, and also the frame to be displayed on the display device 1 is shifted to the second setting frame.

Figure 5:
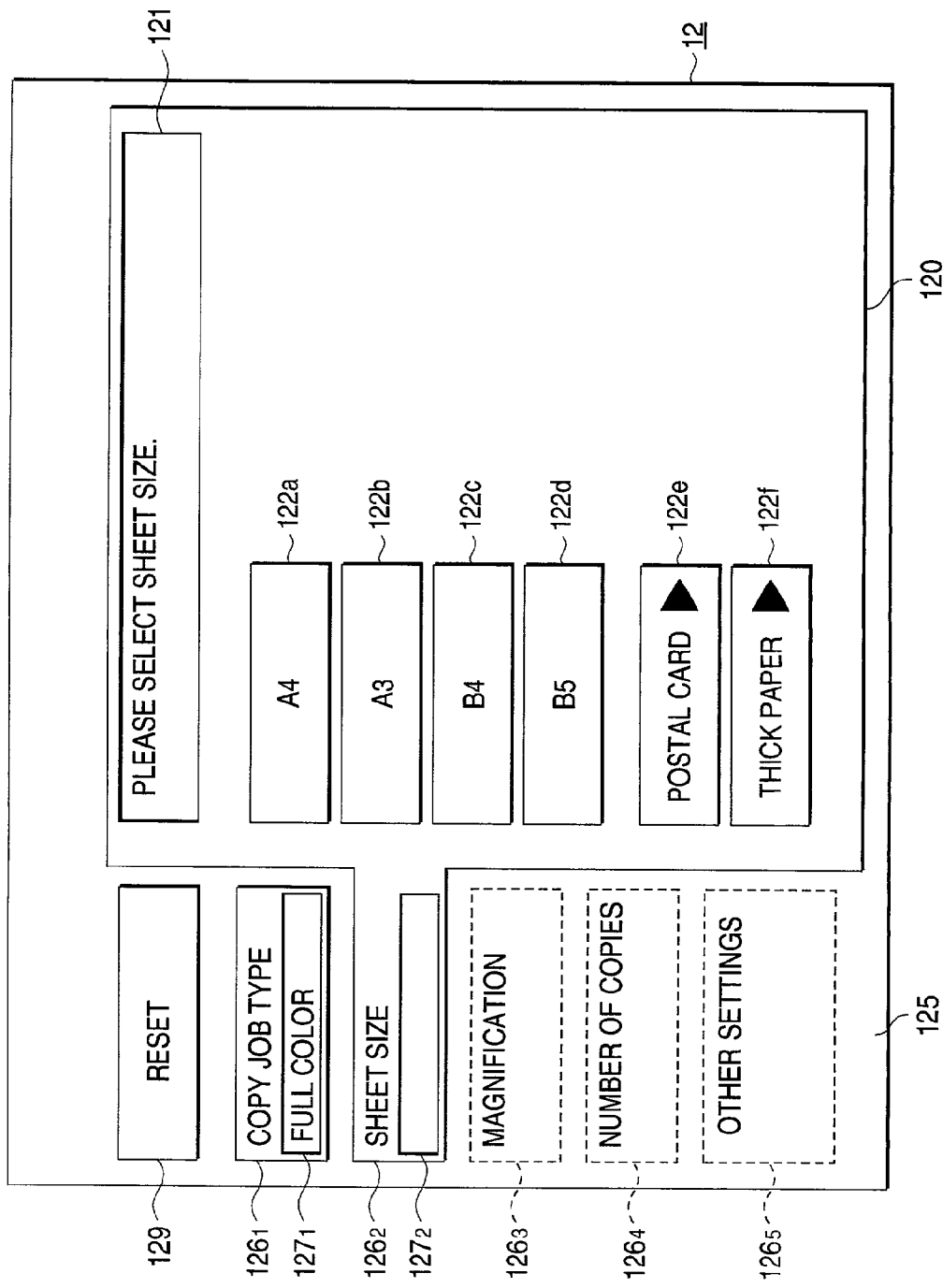
FIG. 5 is a diagram showing a configuration of a sheet size setting frame which is a second setting frame.

FIG. 5 is a diagram showing the configuration of the sheet size setting frame 12 which is a second setting frame of this embodiment.

Like the type setting frame 11, the size setting frame 12 is designed to have a setting menu display area 120 which is located at the right side of the size setting frame 12 and displays a sheet size setting menu, and a hierarchical menu display area 125 which is located at the left side of the size setting frame and displays the hierarchical menu. A reset button 129 is disposed at the upper left side of the size setting frame.

A size setting menu to be operated in the size setting frame 12 is displayed in the setting menu display area 120. The internal configuration of the setting menu display area 120 is substantially the same as the setting menu display area 110 of the type setting frame 11, and a setting item name "sheet size" is displayed in an instruction content display window 121 to indicate selection of a parameter value. Further, six parameter input buttons 112a to 122f for inputting parameters are disposed below the instruction content display window 121.

Further, a list of five menu item buttons $126_1$ to $126_5$ is displayed in the hierarchical menu display area 125. Of these buttons, a second button ("sheet size" menu item button $126_2$) is displayed as the menu item button being set as if it is a tag connected to the setting menu display area 120. Further, the third to fifth lower menu item buttons $126_3$ to $126_5$ are displayed as non-set menu item buttons.

The first "copy job type" menu item button $126_1$ has been already set on the upper setting frame 11, and it is the menu item corresponding to the setting menu on which parameters have been already set. Therefore, the menu item button $126_1$ which has been already set is displayed in the same display style as the menu item button $126_2$ being set. However, the menu item button $126_1$ which has been already set is not connected to the setting menu display area 120 and displayed in the form of a normal button unlike the menu item button $126_2$ being set.

Since no parameter has been set in the menu item button $126_2$ being set, no parameter value is displayed in the parameter display window $127_2$. On the other hand, in the menu item button $126_1$ which has been already set, the parameter value "full color" set in the type setting menu is displayed in the parameter display window $127_1$.

When any one of the parameter input buttons 122a to 122f for displaying the parameter values "A4", "A3", "B4", "B5", "postal card" and "thick paper" which can be set for the setting item "sheet size" of the size setting menu, for example, the parameter input button 122a for selecting "A4" is pushed on the size setting frame 12 (second setting frame) thus constructed, the parameter value corresponding to the parameter input button thus pushed is set as the parameter of "sheet size". Further, a third setting frame is created and the frame to be displayed is shifted to the third setting frame.

Figure 6:
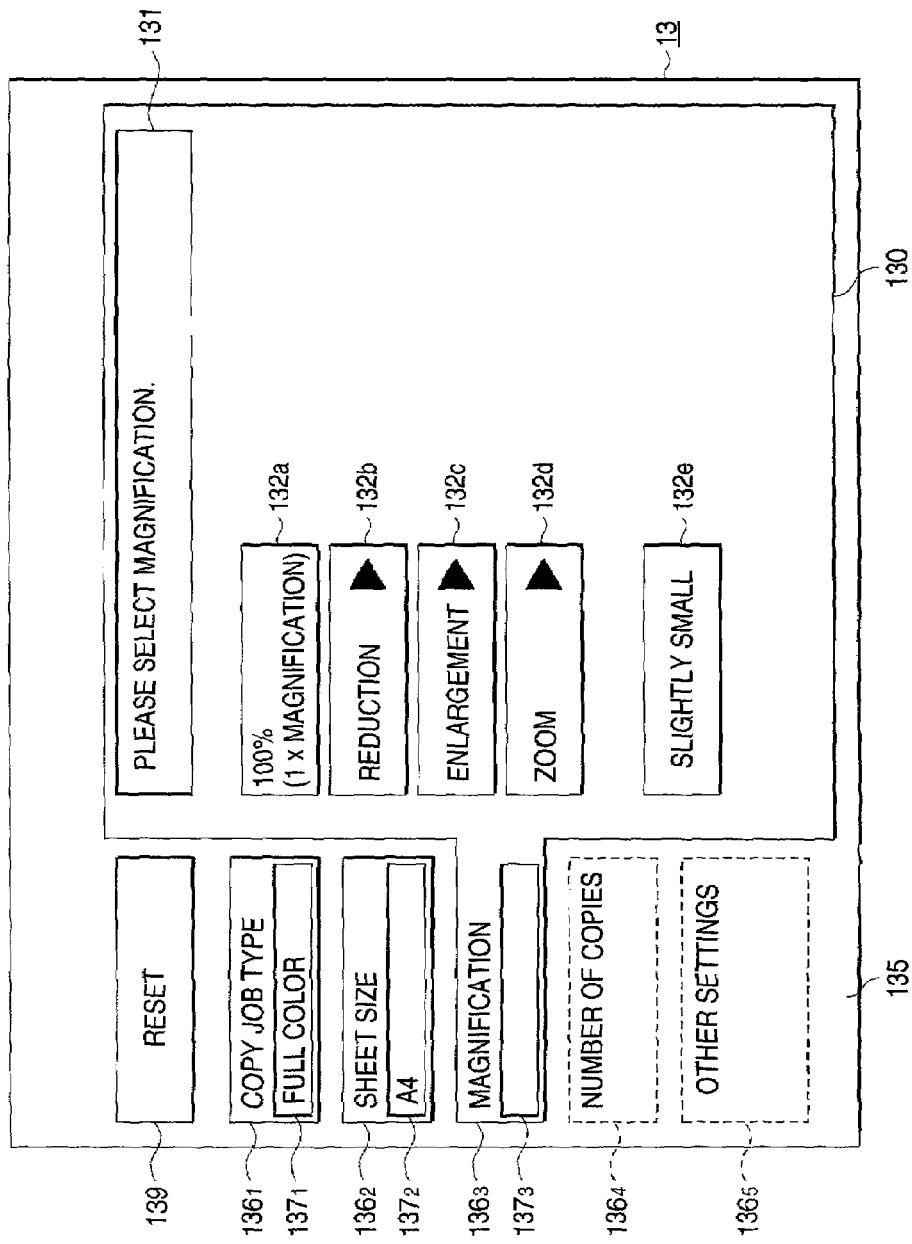
FIG. 6 is a diagram showing a configuration of a magnification setting frame which is a third setting frame.

FIG. 6 is a diagram showing the configuration of a magnification setting frame 13 which is the third setting frame of this embodiment. Likewise the setting frames 11, 12, the magnification setting frame 13 includes a setting menu display area 130 which is located at the right side of the magnification setting frame 13 and displays a magnification setting menu, and a hierarchical menu display area 135 which is located at the left side of the magnification setting frame 13 and displays a hierarchical menu. A reset button 139 is disposed at the upper left portion of the magnification setting frame 13.

The magnification setting menu to be operated on the magnification setting frame 13 is displayed in the setting menu display area 130. A setting item name "magnification" is displayed in an instruction content display window 131 at the upper portion of the magnification setting frame 13 to indicate selection of parameter values. Further, five parameter input buttons 132a to 132e for inputting parameters are disposed below the instruction content display window 131.

Further, a list of five menu item buttons $136_1$ to $136_5$ is displayed in the hierarchical menu display area 135, and a third "magnification" menu item button $136_3$ out of these buttons is displayed as a menu item button being set as if it is a tag connected to the setting menu display area 130. The lower fourth and fifth menu item buttons $136_4$, $136_5$ are displayed as non-set menu item buttons. The upper first and second menu item buttons $136_1$, $136_2$ are displayed as menu item buttons which have been already set, and the parameter values "full color" and "A4" set in the respective setting menus are displayed in the corresponding parameter display windows $137_1$, $137_2$.

When any one of the parameter input buttons 132a to 132e for displaying the parameter values "100% (×1 magnification)", "reduction", "enlargement", "zoom", "slightly small" which can be set for the setting item "magnification" of the magnification setting menu, for example, the parameter input button 132a for selecting "100%" is pushed in the magnification setting frame 13 (third setting frame) thus constructed, the parameter value corresponding to the parameter input button thus pushed is set as the parameter of "magnification". Further, a fourth setting frame is created and the frame to be displayed is shifted to the fourth setting frame.

Figure 7:
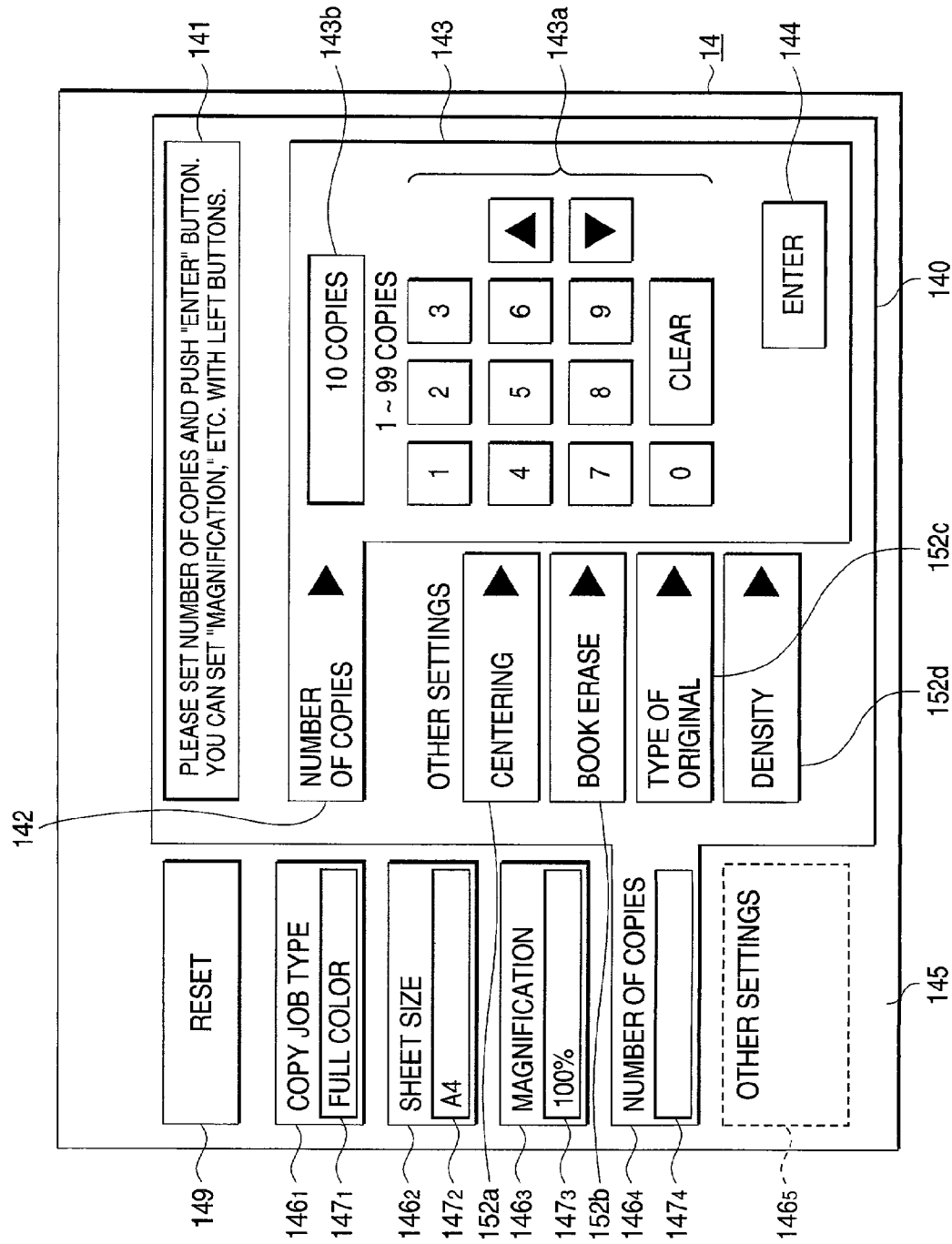
FIG. 7 is a diagram showing a configuration of a number-of-copies setting frame which is a fourth setting frame.

FIG. 7 is a diagram showing the configuration of the number-of-copies setting frame 14 which is the fourth setting frame of this embodiment. Like the setting frames 11 to 13, the number-of-copies setting frame 14 includes a setting menu display area 140 which is located at the right side of the number-of-copies setting frame 14 and displays a number-of-copies setting menu, and a hierarchical menu display area 145 which is located at the left side of the frame 14 and displays a hierarchical menu. A reset button 149 is disposed at the upper left portion of the frame 14.

The number-of-copies setting menu to be operated on the number-of-copies setting frame 14 is displayed in the setting menu display area 140. A setting item name "number of copies" is displayed in an instruction content display window 141 at the upper portion of the frame 14 to indicate selection of a parameter value. Further, a parameter input button 142 is disposed below the instruction content display window 141.

The parameter input button 142 is kept in a selected state at all times on the number-of-copies setting frame 14, and a number-of-copies input portion 143 for allowing an operator to input the number of copies (parameter value) to be set is displayed at the right side of the frame 14 so as to be connected to the right end portion of the parameter input button 142. The number-of-copies input portion 143 contains a ten key portion 143a for inputting the number of copies, a number-of-copies display window 143b for displaying the number of copies thus input, and an enter button 144 for checking and determining the number of copies thus input.

Further, a list of five menu item buttons $146_1$ to $146_5$ is displayed in the hierarchical menu display area 145, and the fourth "number-of-copies" menu item button $146_4$ out of these buttons is displayed as a menu item button being set as if it is a tag connected to the setting menu display area 140. The fifth lower menu item button $146_5$ is displayed as a non-set menu item button. The first to third upper menu item buttons $146_1$ to $146_3$ are displayed as menu item buttons which have been already set, and the parameter values "full color", "A4" and "100%" set in the respective setting menus are displayed in the respective parameter display windows $147_1$ to $147_3$.

On the number-of-copies setting frame 14 (fourth setting frame) thus constructed, the number of copies which is a parameter value to be set, for example, "10" is input through the ten key portion 143a of the number-of-copies input portion 143 displayed so as to be connected to the parameter input button 142 for the setting item "number of copies" of the number-of-copies setting menu. When the number of copies thus input is checked on the basis of the display in the number-of-copies display window 143b and then an enter button 144 is pushed, the parameter value thus input is set as the parameter of "number of copies".

After the four hierarchical setting menus of (1) the copy job type setting menu, (2) the sheet size setting menu, (3) the magnification setting menu and (4) the number-of-copies setting menu are sequentially operated along the hierarchical structure of the hierarchical menu by using the respective setting frames 11 to 14, the setting of the parameters for the processing type and the operating condition which are required to execute the copying operation is finished. Thereafter, the processing start frame is created and the frame to be displayed is shifted to the processing start frame.

With respect to (5) the other setting menu, the setting items contained in this setting menu are not indispensable, and thus the description on the menu operation and the parameter setting thereof is omitted from the description on the operational procedure which is now being made. The operation of this setting menu, etc. will be described later.

Figure 8:
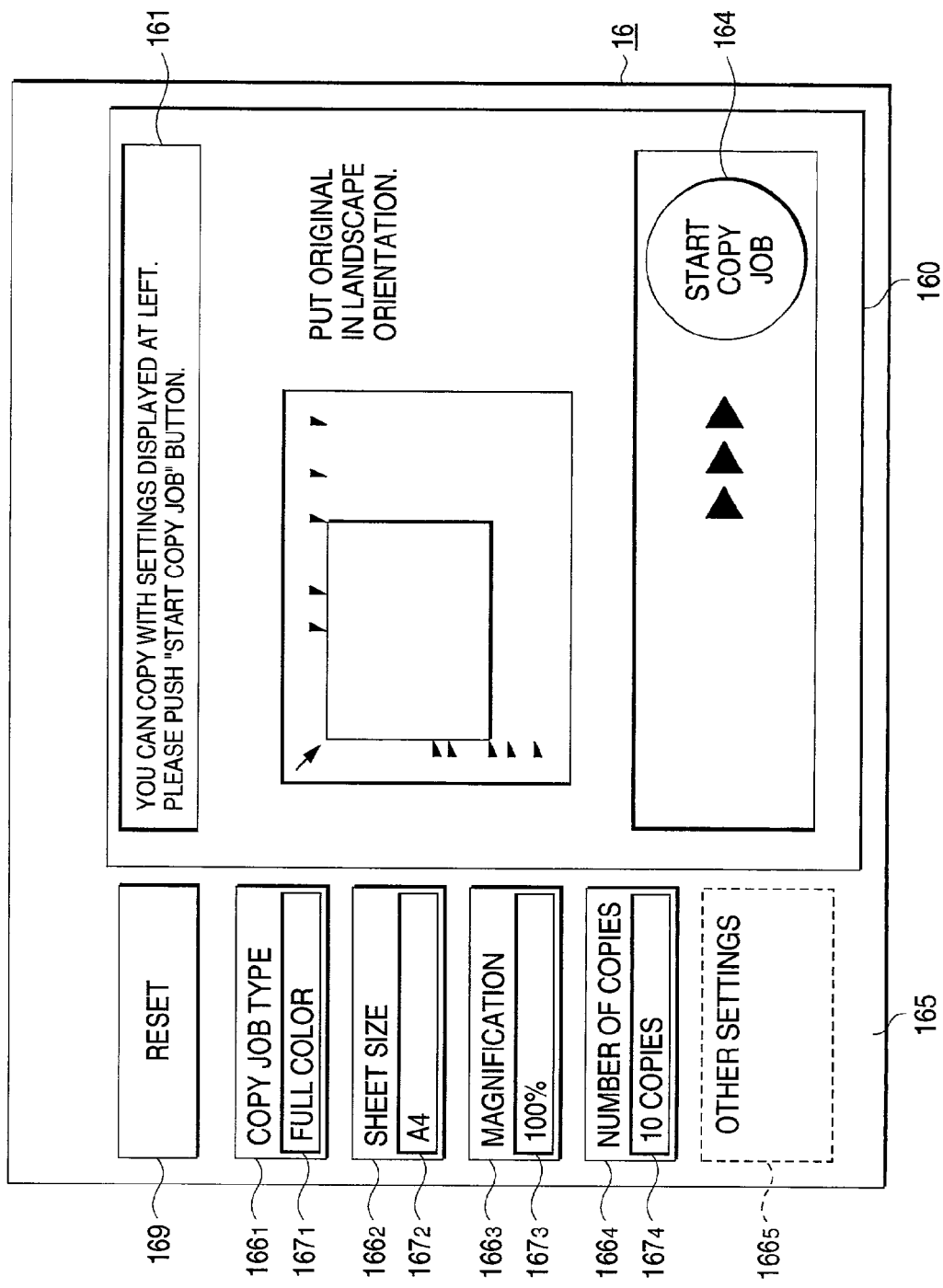
FIG. 8 is a diagram showing a configuration of a processing start frame.

FIG. 8 is a diagram showing the configuration of the processing start frame 16 in this embodiment.

The processing start frame 16 has a similar configuration to the setting frames 11 to 14, and it includes an instructing menu display area 160 which is located at the right side of the frame 16 and displays an instructing menu for starting the execution of the copying operation, and a hierarchical menu display area 165 which is located at the left side of the frame 16 and displays a hierarchical menu. A reset button 169 is disposed at the upper left portion of the frame 16.

A processing start instructing menu to be operated on the processing start frame 16 is displayed in the instructing menu display area 160, and an instruction content on the instructing menu is displayed in an instruction content display window 161 located at the upper portion of the frame 16. Further, an instruction content such as a mount way of an original or the like is supplementarily displayed at the lower portion of the frame 16. In addition, a copy job start button 164 for instructing to start the execution of the copying operation which is a predetermined processing operation in the apparatus is disposed at the lower portion of the frame 16.

Further, a list of five menu item buttons $166_1$ to $166_5$ is displayed in a hierarchical menu display area 165. The lowest fifth menu item button $166_5$ out of these buttons has not been subjected to the parameter setting for the setting item thereof as described above in the case of FIG. 8, and thus it is displayed as a non-set menu item button. On the other hand, the first to fourth menu item buttons $166_1$ to $166_4$ are displayed as menu item buttons which have been already set, and the parameter values "full color", "A4", "100%" and "ten copies" set in the respective setting menus are displayed in the respective parameter display windows $167_1$ to $167_4$.

When the copy job start button 164 is pushed after it has been checked on the processing start frame 16 thus constructed that all the parameter values displayed in the parameter display windows $167_1$ to $167_4$ of the respective menu item buttons $166_1$ to $166_4$ within the hierarchical menu display area 165 are set to desired values, the execution of the copying operation is started on the basis of the processing type and the operating condition specified on the basis of the respective parameter values thus set. Further, a processing execution frame is created, and the frame to be displayed is shifted to the processing execution frame.

Figure 9:
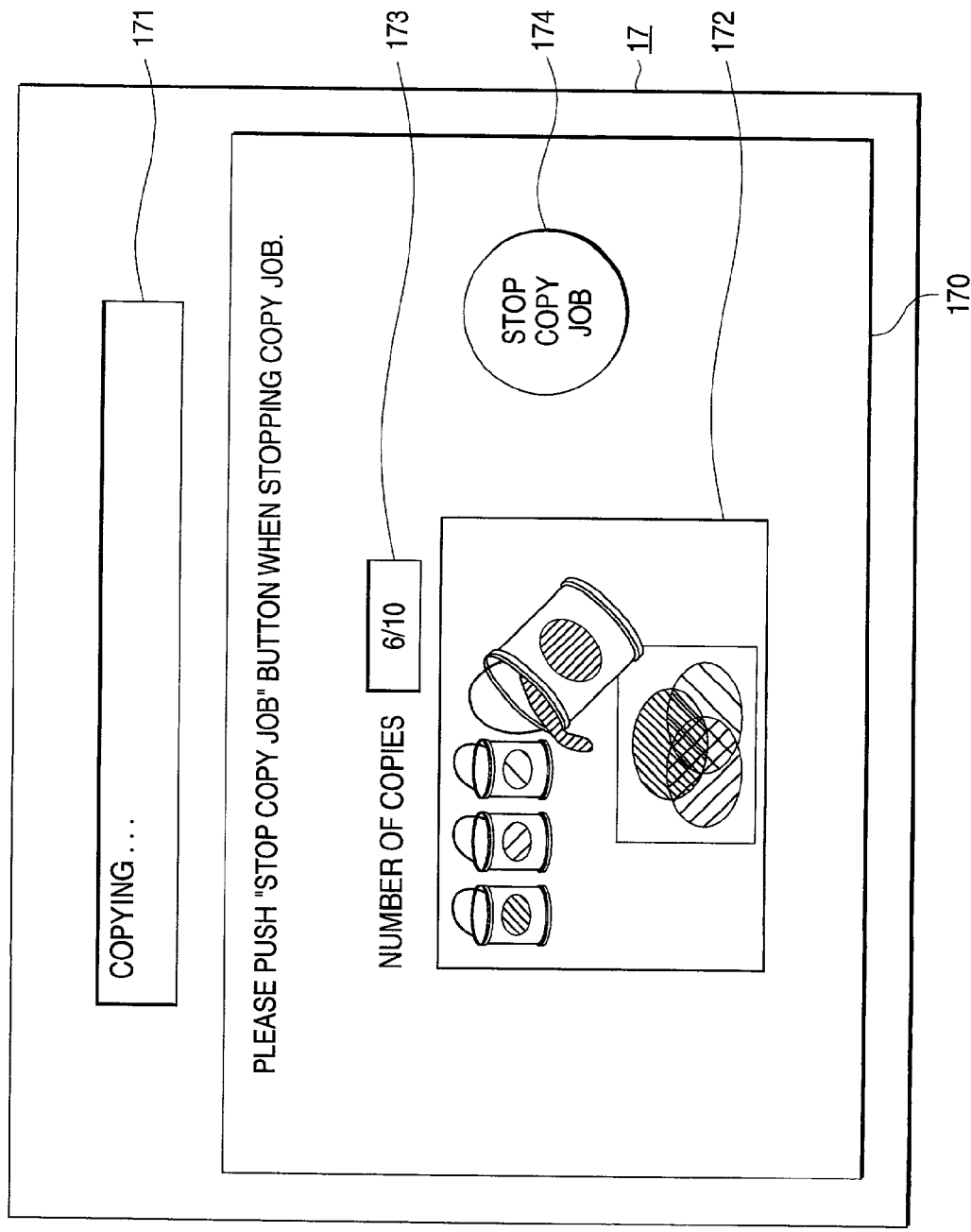
FIG. 9 is a diagram showing a configuration of a processing executing frame.

FIG. 9 is a diagram showing the configuration of the processing execution frame 17 in this embodiment.

The processing execution frame 17 is displayed during the execution of the copying operation after the setting of the parameter values on the setting frames 11 to 14 and the check of the parameter values on the processing start frame 16 are completed. Accordingly, the processing execution frame 17 is not provided with the hierarchical structure of the setting menus and the hierarchical menu display area in which the set parameter values are displayed, and only the instructing menu display area 170 and the instruction content display window 171 located above the instructing menu display area 170 are displayed on the processing execution frame 17.

The instructing menu display area 170 is provided with a processing type display window 172 for displaying the copy job type selected and executed in the copying operation being executed with pictures such as animation or the like, and a processing status display window 173 for displaying the current frequency of the copying operation (the current number of copies) which is being executed. Further, a copy job stop button 174 for forcedly stopping the execution of the copying operation at some midpoint of the coping operation is displayed at the right side of the processing type display window 172. In FIG. 9, the processing execution frame 17 indicates that the number of copies set is 10 and the copying operation for the sixth copy is being executed.

Under the state that the above processing execution frame 17 is displayed, the execution of the copying operation is continued, and if the copying operation instructed is perfectly completed, the copying operation based on the respective parameter values set in the hierarchical menu is completed. Further, a processing end frame is created, and the frame to be displayed is shifted to the processing end frame.

Figure 10:
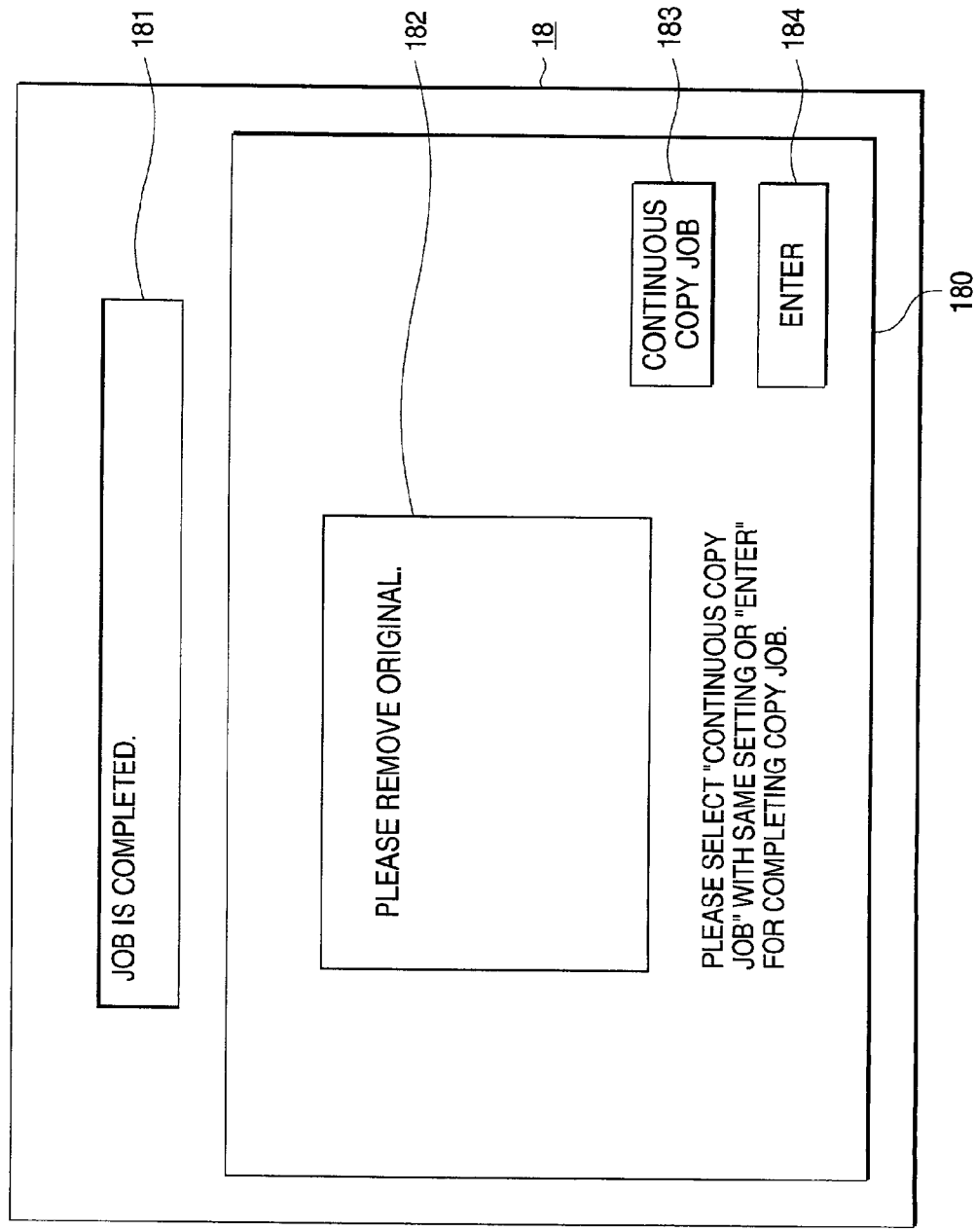
FIG. 10 is a diagram showing a configuration of a processing ending frame.

FIG. 10 is a diagram showing the configuration of the processing end frame 18 in this embodiment.

Like the processing execution frame 17, the processing end frame 18 contains an instructing menu display area 180, and an instruction content display window 181 located above the instructing menu display area 180.

The instructing menu display area 180 is provided with an end instructing display window 182 for indicating the end of the copying operation or an instructing matter or the like after the copying operation is completed. Further, a continuous copy job button 183 for continuing the copying operation based on the same parameter values, and an enter button 184 for checking the end of the copying operation are disposed at the right side of the end instructing display window 182.

When the enter button 184 is pushed on the processing end frame 18, the copying operation is perfectly completed, and the parameter values set for the respective setting items are cleared. Therefore, in order to enable the start of the setting of parameters for a next copying operation, the frame to be displayed is shifted to the copy job type setting frame 11 (first setting frame) again to wait for an input from the operator. The foregoing process is the operating procedure of the basic menu operating method in the menu operating device and the image processing apparatus of this embodiment.

Here, the setting menu selecting function (setting frame shifting function) of the menu item button displayed in the hierarchical menu display area will be described.

The menu operation is prohibited from being carried out on each of the five setting menus contained in the hierarchical menu due to the hierarchical structure of the menus if the parameter setting on any setting menu higher than the setting menu concerned has not yet been finished. For setting menus which have been already operated and thus on which parameters have been already set, there occurs such a case that any one of the setting menus which have been already set is required to be re-operated in order to alter or check the set parameter value thereof during the time period for which a setting menu lower than the setting menus is being operated.

According to the menu operating device and the image processing apparatus of this embodiment, in order to satisfy the above requirement for the setting menus on which the parameters have been already set, by referring to the menu item buttons which are displayed in the form of a list in the hierarchical menu display area, the setting frame which is being displayed and set at the time point can be directly returned to any desired one of the setting frames which have been already set.

That is, on the setting frames 12 to 14 other than the setting frame 11 corresponding to the uppermost setting menu in the hierarchical menu, the menu items corresponding to the setting menus (setting frames) higher than the setting menu being operated on any one of the setting frames 12 to 14 are displayed in the respective hierarchical menu display areas as menu item buttons which have been already set. These menu item buttons which have been already set are allowed to function as setting menu selection buttons to select and return to desired setting menu and setting frame, whereby the setting frame being displayed can be directly returned to the setting frame corresponding to the desired setting menu to be re-operated.

Specifically, the menu item button $126_1$ on the size setting frame 12 (FIG. 5), the menu item buttons $136_1$, $136_2$ on the magnification setting frame 13 (FIG. 6) and the menu item buttons $146_1$ to $146_3$ on the number-of-copies setting frame 14 (FIG. 7) can function as the setting menu selection buttons.

For example, when the menu item button $146_1$ corresponding to the copy job type setting menu on the number-of-copies setting frame 14 under the state shown in FIG. 7 is pushed, the frame being displayed is returned to the type setting frame 11 while the parameter values which have been set on the setting menus "sheet size" and "magnification" are kept except for the selected "copy job type" setting menu.

Figure 11:
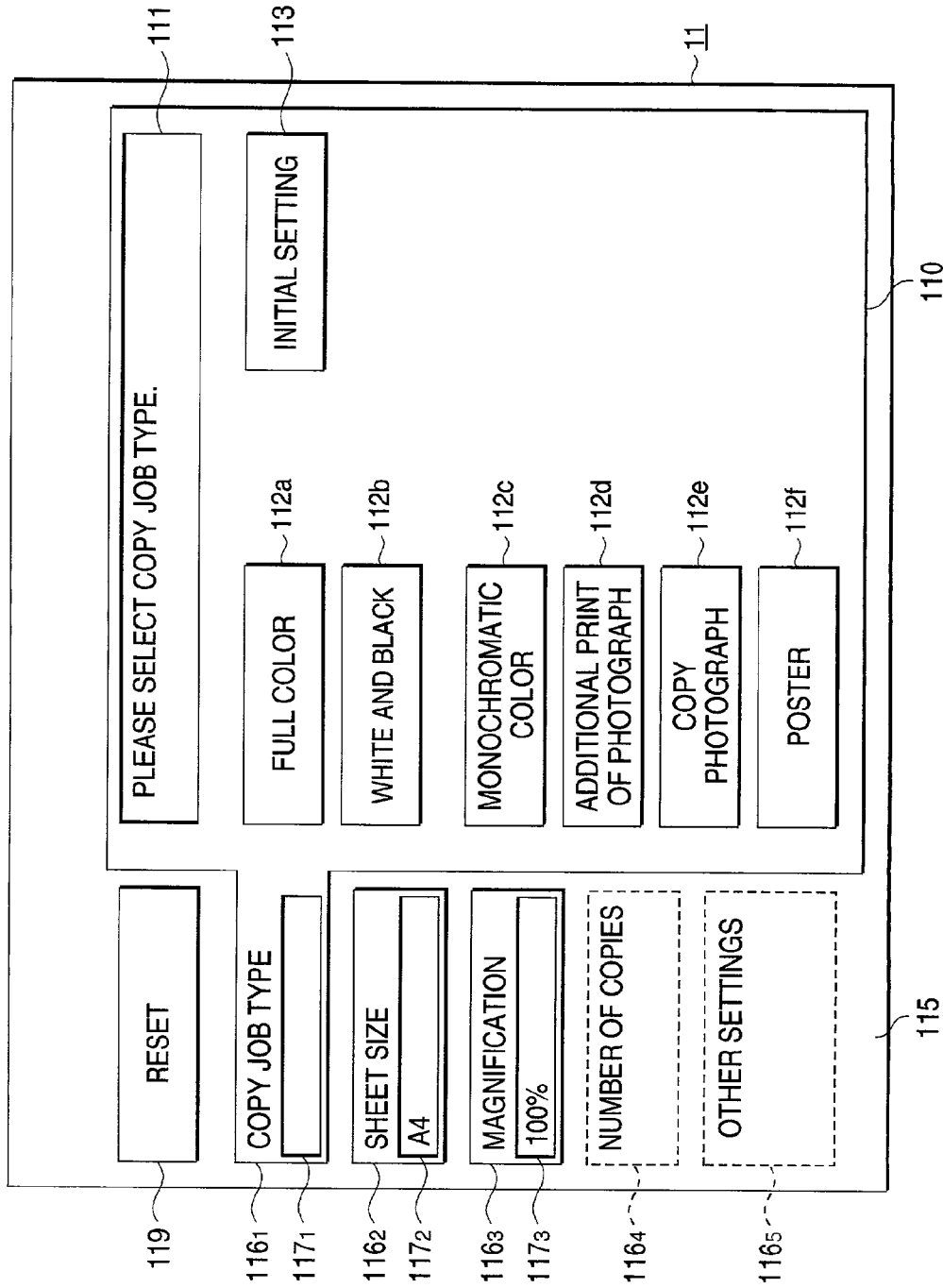
FIG. 11 is a diagram showing another configuration of the copy job type setting frame which is the first setting frame.

FIG. 11 shows the state of the type setting frame 11 thus returned. Here, the menu item button $116_4$ corresponding to the "number-of-copies" setting menu which was being operated before return is displayed as a non-set menu item button because the number-of-copies setting frame 14 is returned to the type setting frame 11 with the parameter thereof being left non-set.

The menu item button $116_1$ is displayed as a menu item button being set (reset) as if it is a tap connected to the setting menu display area 110 as in the case of the menu item button being set in the case of the normal type setting frame 11 shown in FIG. 4. Here, the parameter value "full color" set before return is cleared to reset the parameter, and the parameter display window $117_1$ is set to be non-set.

In FIG. 4, each of the menu item buttons $116_2$ to $116_5$ is displayed as a menu item button which is lower than the menu item buttons $116_1$ being set and on which any parameter has not yet been set. On the other hand, in FIG. 11, the "sheet size" menu item button $116_2$ and the "magnification" menu item button $116_3$ of the lower menu item buttons $116_2$ to $116_5$ correspond to those setting menus on which the parameters have been already set before return. Therefore, these menu item buttons $116_2$ and $116_3$ are displayed as menu item buttons which have been already set, and the parameter values "A4" and "100%" which have been set are displayed in the parameter display windows $117_2$ and $117_3$ thereof.

Figure 12:
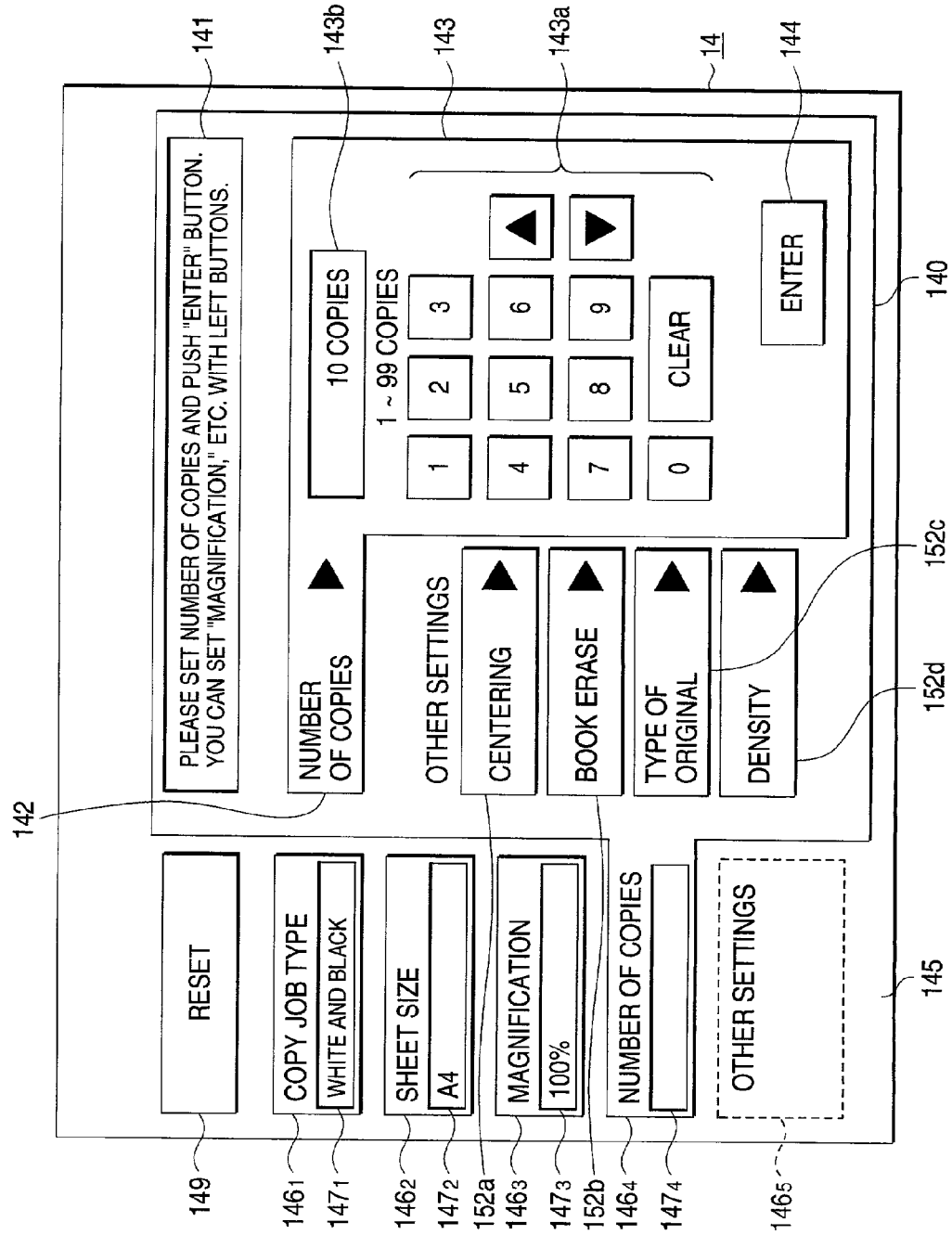
FIG. 12 is a diagram showing another configuration of the number-of-copies setting frame which is the fourth setting frame.

When the parameter input button 112b for selecting the parameter value "white and black" different from the parameter value "full color" set before the parameter is altered is pushed on the type setting frame 11, the "white and black" is reset as a parameter in the type setting menu. The frame to be displayed is automatically restored to the number-of-copies setting frame 14 which had been under setting before the frame was returned to the type setting frame 11. At this time, the number-of-copies setting frame 14 is set as shown in FIG. 12, and the parameter value displayed in the parameter display window $147_1$ within the "copy job type" menu item button $146_1$ is altered from "full color" to "white and black" (see FIG. 7).

On the number-of-copies setting frame 14 (FIG. 7) before the frame is returned to the type setting frame 11 shown in FIG. 11, the value corresponding to the number of copies which is a parameter to be set is input as 10 copies from the ten key portion 143a, and displayed in the number-of-copies display window 143b. However, since the enter button 144 is not pushed, the number of copies (10 copies) thus input is not set (settled) as the parameter.

If under this state the frame to be displayed is returned to the upper type setting frame 11 which has been set and the resetting of the parameter is carried out, it is preferable to keep the number of copies "10 copies" which has been input, but not settled when the frame is returned to the number-of-copies setting frame 14 which was previously under setting after the resetting. In FIG. 12, the number of copies "10 copies" input is displayed in the number-of-copies display window 143b of the number-of-copies setting frame 14 at the time when the frame to be displayed is restored to the number-of-copies setting frame 14 because the parameter value thereof is held.

The non-set menu item buttons out of the menu item buttons do not function as the setting menu selection buttons to shift the display frame to the setting frame corresponding to the setting menu, and they serve as display portions for merely displaying menu items.

In the menu operating method, the menu operating device and the image processing apparatus of the above embodiments, the setting frames corresponding to the respective setting menus contained in the hierarchical menu are equipped with not only the setting menu display areas for displaying the setting items of the setting menus, the choices of the parameter values, etc., but also the hierarchical menu display areas. The plural menu item buttons corresponding to the setting menus (setting frames) of the respective layers are displayed with the hierarchical menu display area, and these menu item buttons are displayed as a list so as to be arranged in the vertical direction so that the higher (upper) menu item buttons in the hierarchical structure of the setting menus are located at the higher positions in the hierarchical menu display area.

At this time, the operator can get information on the hierarchical structure of the menus such as the number of layers, that is, the number of setting menus contained in the hierarchical structure, the order of the setting menus to be operated, etc. for the hierarchical menu for which the setting of the parameters to specify the processing type and the operating condition of the copying operation is carried out. Further, upon viewing a location in a list display of the menu item button corresponding to a setting menu being operated, the operator can obtain the information as to the place at which the setting menu concerned is located in the hierarchical structure.

Accordingly, the operating procedure in the menu operating method and device using the hierarchical menu can be simplified. That is, for example when the operator wants to reset a parameter in a setting menu which has been already set, the operator can grasp the operating procedure for the resetting from the list display. Accordingly, the operability of the menu operation to set the parameters can be enhanced, and also occurrence of erroneous setting and erroneous operation by operators can be suppressed by simplifying the operating procedure.

Further, in the above embodiments, the menu item buttons which have been already set, the menu item buttons under setting, and the non-set menu item buttons which have not yet been set are displayed in different display styles for the parameter setting in each setting menu, whereby they are distinguishable from one another. Accordingly, the operation status of each setting menu or the setting status of the parameter at each time point can be checked from the list display of the menu item buttons.

By providing a parameter display portion to each of the menu item buttons which have been already set and displaying the parameter values which have been already set, the parameter values set in upper (higher) setting menus can be checked even when a lower setting menu is being operated. At this time, the operation of returning the setting frame being displayed to another frame is not required for the parameter checking operation in the re-operation of the setting menus which have been already set, and thus the operation is more simplified.

Further, each of menu item buttons which have been already set in the list of all the menu item buttons displayed is provided with the setting menu selecting function of returning the setting frame being displayed to the setting frame and the setting menu corresponding to any desired one of the menu item buttons which have been already set and to which the operator wants to return for the re-operation. In this case, when the operator wants to return to a setting frame to which the re-operation of the setting menu thereof is required, the operator checks the list display in the hierarchical menu display area to confirm the targeted setting frame, and then can directly return the setting frame being displayed to the desired (targeted) setting frame with the menu item button thereof.

Accordingly, the number of steps required for the resetting of the parameters can be reduced, and the operability of the hierarchical menu can be enhanced. In the above embodiments, the menu items (buttons) are used to perform a list display and select a desired setting menu, however, they may be used to perform a list display and merely check the setting menu. In this case, the setting frame being displayed may be returned to the desired setting frame (setting menu) by a setting menu selecting unit provided separately from the menu items (buttons) after the desired setting frame is confirmed from the list of the menu items. Further, there may be used an operating procedure of checking the number of layers to be turned from the list display until the setting frame being displayed is returned to the desired setting frame and pushing the one-frame turn-back button at the number of times corresponding to the number of layers thus checked.

By automatically restoring the desired setting menu to the setting menu being set again after the setting frame being displayed is returned to the desired setting frame (corresponding to a higher setting menu) by using the menu item button, the operating procedure can be easily restored to the original operating procedure after the resetting is carried out. Further, it is not necessary to input the parameter again by keeping the parameter value being set when the setting frame is restored to the original setting frame, thereby further enhancing the menu operability.

However, after the re-operation of the setting menu on the setting frame thus restored is completed, the operator may manually shift the setting frame without automatically restoring the setting frame. In this case, if there is any setting menu which is lower than the setting menu thus re-operated and has been already set, the setting frame may be shifted by pushing the menu item button corresponding to the setting menu concerned or the like.

(5) The other setting menu out of the five setting menus is a setting menu to which the parameter setting is not necessarily required to execute the copying operation (hereinafter referred to as "option setting menu"). Therefore, the setting menu is set as the lowest (least significant) setting menu. It is not provided with the setting frames corresponding to the respective setting frames 11 to 14 for the other setting menus, and the execution of the copying operation can be carried out without operating this setting menu.

The other setting menu is constructed to contain plural option setting menus. In order to operate these option setting menus to optionally set parameters if occasion demands, four option setting buttons 152a to 152d are disposed in the setting menu display area 140 of the number-of-copies setting frame 14 as shown in FIG. 7. In this embodiment, four setting items "centering", "book erase", "type of original", "density" are provided as the option setting items for which the optional parameter setting can be carried out in the other setting menu.

These option setting items can be selected by the option setting buttons 152a to 152d, respectively. By pushing any one of the option setting buttons 152a to 152d, the option setting menu for setting the parameter of the option setting item corresponding to the option setting button thus pushed is displayed on the option setting frame.

Figure 13:
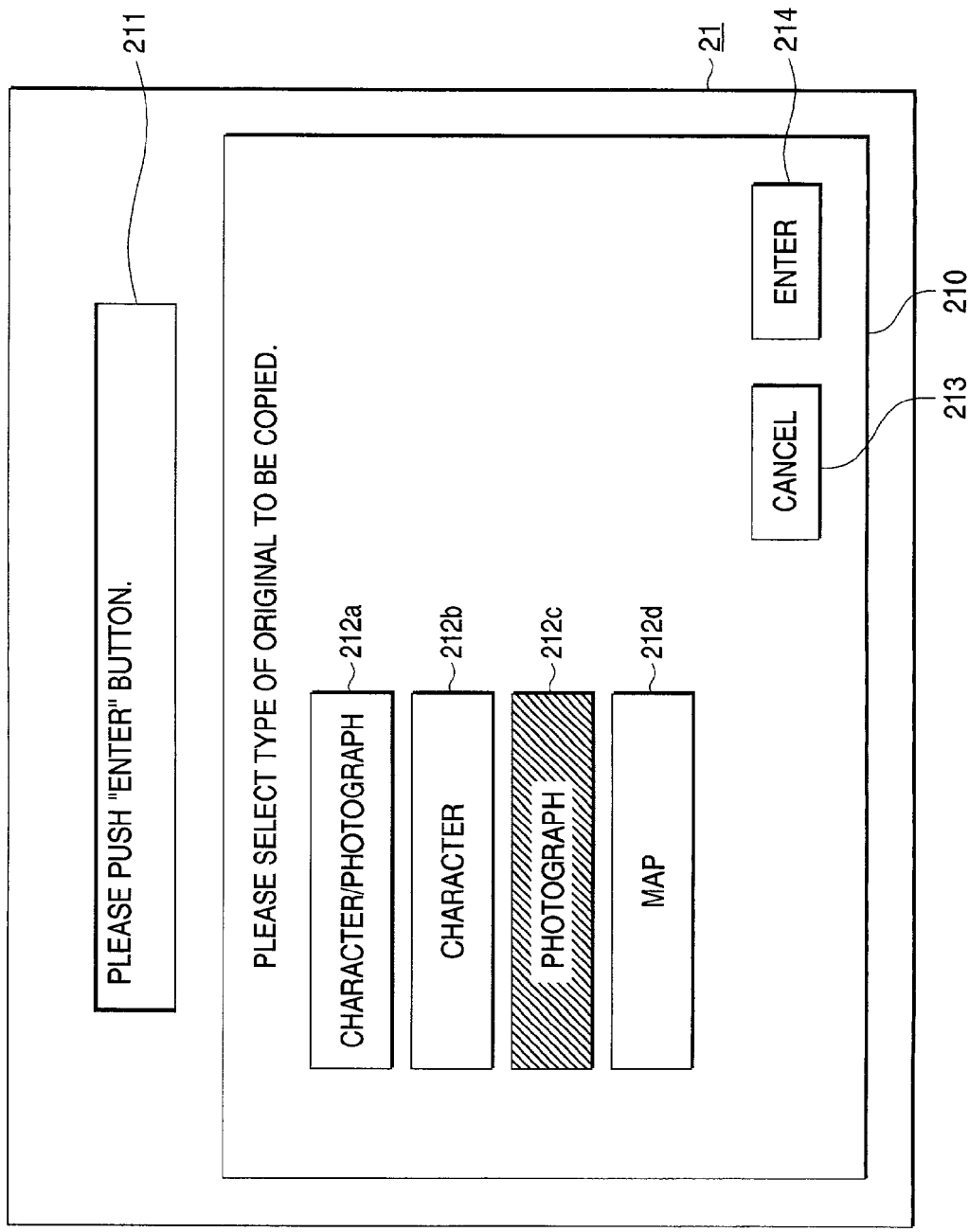
FIG. 13 is a diagram showing a configuration of a original type option setting frame.

FIG. 13 is a diagram showing the configuration of the original type option setting frame 21 for operating the "type of original" option setting menu as an example of the option setting frame in this embodiment.

When the option setting button 152c for selecting the option setting item "type of original" is pushed in the number-of-copies setting frame 14, the frame to be displayed is shifted to the option setting frame 21. An option setting menu display area 210 and an instruction content display window 211 located at the upper side of the option setting menu display area are displayed on the option setting frame 21.

Further, an original type option setting menu to be operated on the option setting frame 21 is displayed in the option setting menu display area 210, and four parameter input buttons 212a to 212d for inputting parameters are disposed on the original type option setting menu. A setting cancel button 213 for cancel the optional setting and an enter button 214 for checking and settling the parameter value input are displayed at the lower right side of the parameter input buttons 212a to 212d.

FIG. 13 shows the state that the parameter input button 212c for selecting "photograph" out of the parameter values "character/photograph", "character", "photograph" and "map" settable for the setting item "type of original" of the original type option setting menu is pushed. The parameter input button 212c thus pushed is recognizable as being selected by making a button display style such as color or the like different from that before the button is selected (as indicated by a notched portion in FIG. 13). When the enter button 214 is pushed under the above state, "type of original" is settled to "photograph", that is, "photograph" is optionally set as the parameter, and then the frame being displayed is restored to the number-of-copies setting frame 14 again.

Figure 14:
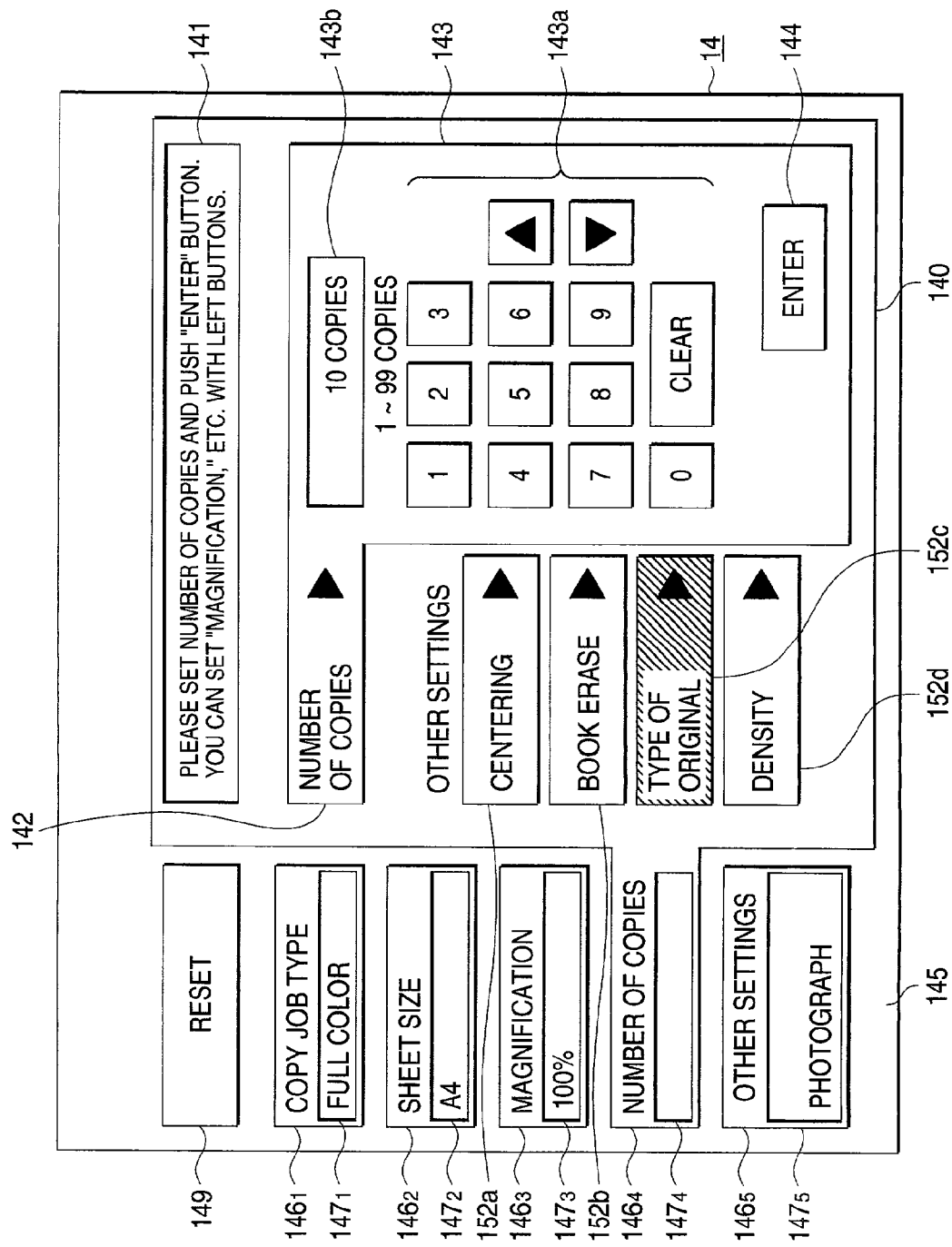
FIG. 14 is a diagram showing another configuration of the number-of-copies setting frame which is the fourth setting frame.

When the parameter setting is carried out in the option setting menu contained in the other setting menu as described above, the option setting button 152c is displayed as being selected (notched) in the setting menu display area 140 on the number-of-copies setting frame 14 as shown in FIG. 14. Further, the fifth menu item button $146_5$ corresponding to the other setting menu in the hierarchical menu display area 145 is displayed as a menu item button which has been already set, and the parameter value "photograph" set in the original type option setting menu is displayed in the parameter display window $147_5$.

On the subsequent processing start frame 16 (see FIG. 8), the menu item button $165_5$ is likewise displayed as a menu item button which has been already set, and the optionally-set parameter value "photograph" is displayed in the parameter display window thereof.

The option setting frame as shown in FIG. 13 is created in the same way for the other option setting items "centering", "book erase", "density" than "original type". When the option setting buttons 152a, 152b, 152d for selecting the corresponding setting items are pushed, the option setting frames corresponding to the respective option setting menus are displayed to perform the parameter option setting.

The parameter display window $147_5$ displayed on the menu item button $146_5$ of the number-of-copies setting frame 14 is partitioned into four sections in association with the four option setting items, and the parameter values which have been optionally set can be displayed on these sections. The same display arrangement is provided to the fifth "other settings" menu item button in each of the other setting frames.

When the setting cancel button 213 located below the option setting menu display area 210 is pushed on the option setting frame 21, the setting frame being displayed is restored to the number-of-copies setting frame 14 shown in FIG. 7 under the state that no parameter is set to "type of original". The same is satisfied to the other option setting frames. Each option setting frame is not provided with any hierarchical menu display area as displayed in the setting frames 11 to 14, however, it may be provided with the same hierarchical menu as the normal setting frames, if necessary.

Figure 15:
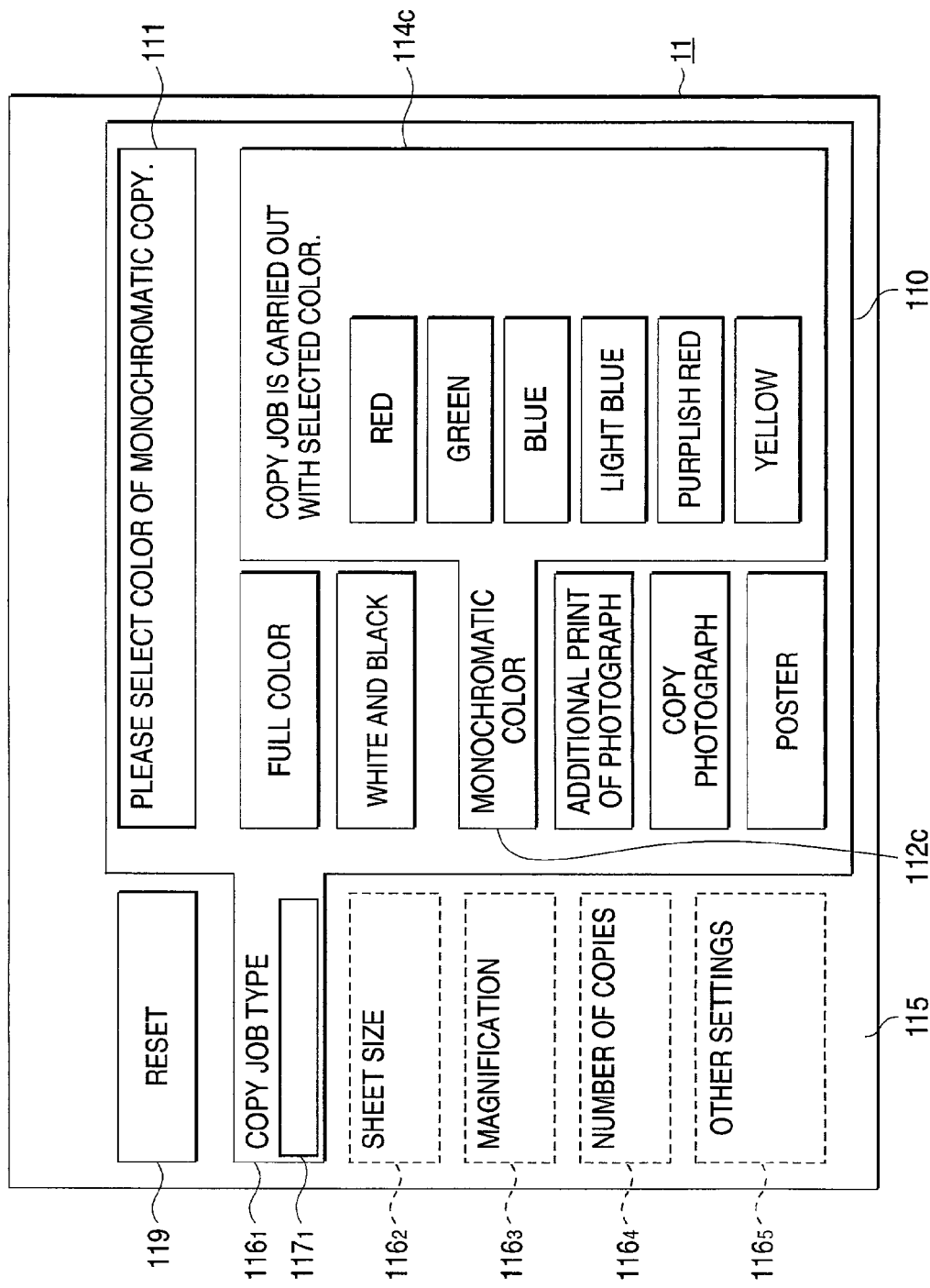
FIG. 15 is a diagram showing another configuration of the copy job type setting frame which is the first setting frame.
Figure 16:
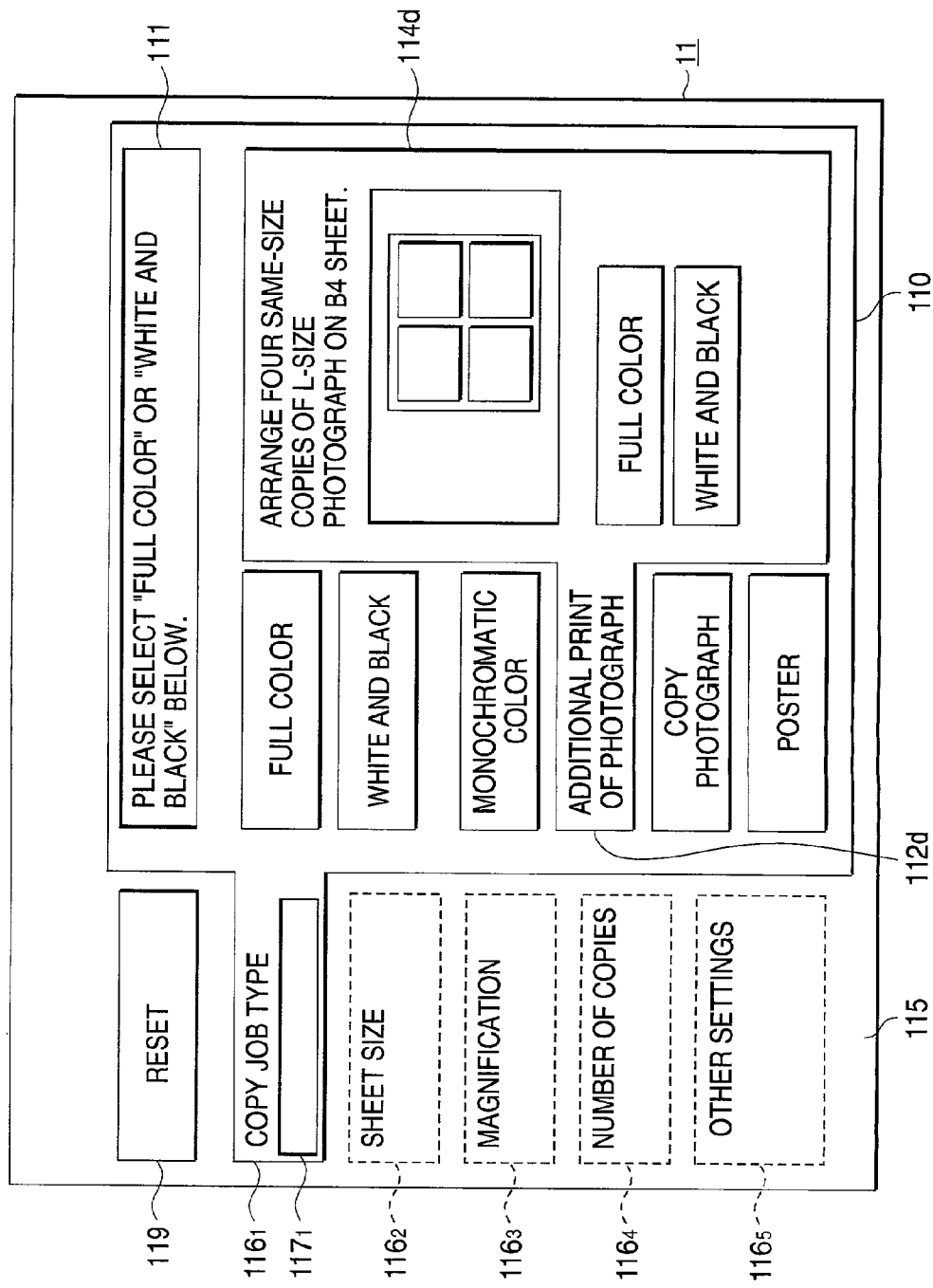
FIG. 16 is a diagram showing another configuration of the copy job type setting frame which is the first setting frame.

In the respective setting menus to be operated on the setting frames 11 to 14, some parameter input buttons displayed in the setting menu display area have sub menus for setting parameters more minutely. For example, the type setting menu of the type setting frame 11 (FIG. 4) has a "monochromatic color" input button 112c (see a sub menu display portion 114c shown in FIG. 15), an "additional print of photograph" input button 112d (see a sub menu display portion 114d shown in FIG. 16), a "photograph copy" input button 112e and a "poster" input button 112f as a sub menu.

Figure 17:
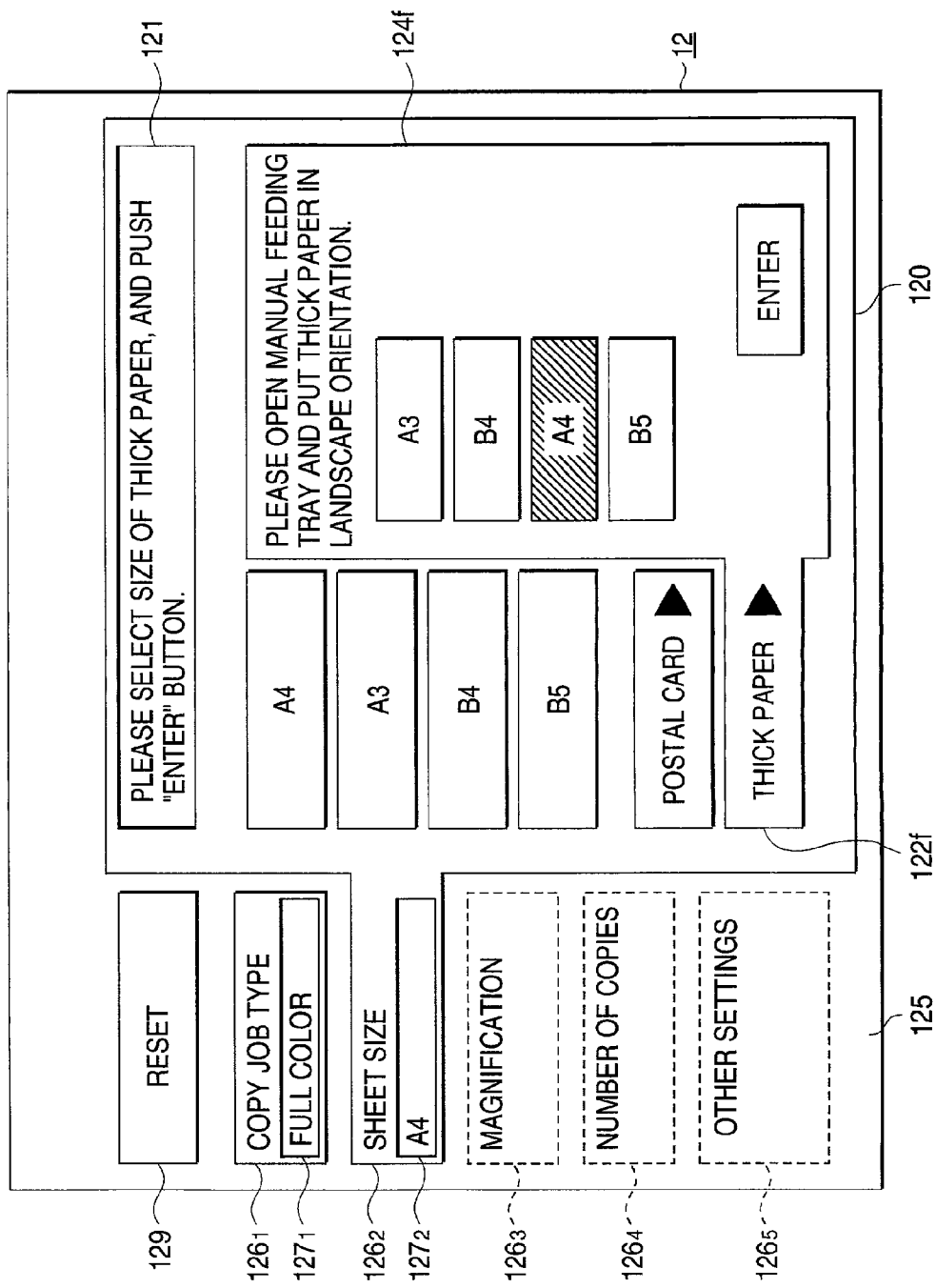
FIG. 17 is a diagram showing another configuration of the sheet size setting frame which is the second setting frame.
Figure 18:
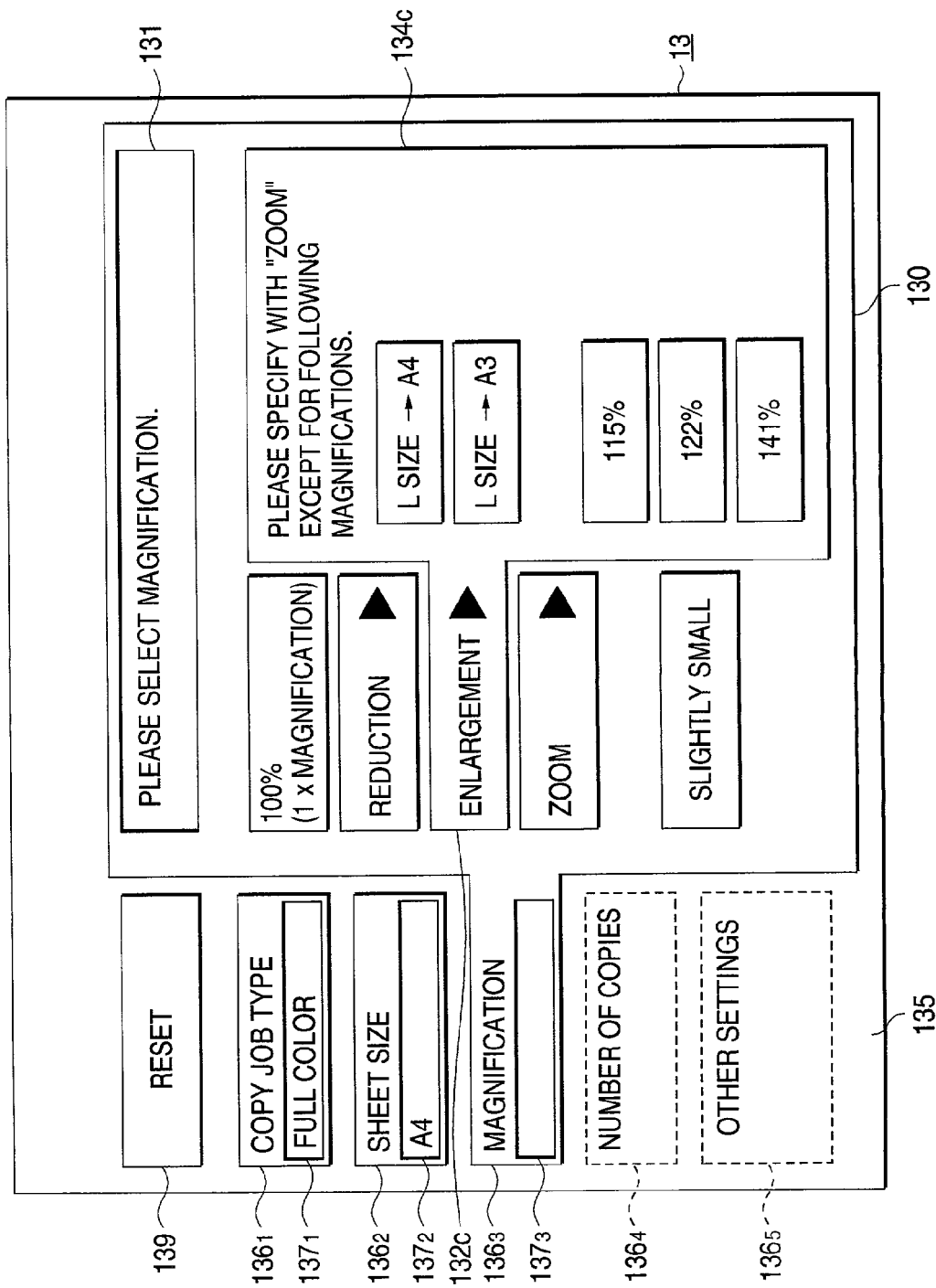
FIG. 18 is a diagram showing another configuration of the magnification setting frame which is the third setting frame.

Further, the size setting menu of the size setting frame 12 (FIG. 5) has an "postal card" input button 122e and a "thick paper" input button 122f (see a sub menu display portion 124f shown in FIG. 17) as a sub menu. The magnification setting menu of the magnification setting frame 13 (FIG. 6) has a "reduction" input button 132b, an "enlargement" input button 132c (see a sub menu display portion 134c shown in FIG. 18) and a "zoom" input button 132d as a sub menu.

These sub menus are used to minutely set parameters for indispensable setting items in the respective setting menu, and they are different from the option setting menus on option setting items which are not indispensable. Therefore, as show in FIGS. 15 to 18, each of these sub menus is displayed at the right side of the setting menu display areas 110, 120, 130 so as to be connected to the corresponding parameter input button while keeping the display contents in the other frame areas of the setting frames 11 to 13. The more minute parameter values can be input by using the parameter input buttons which are further displayed in each sub menu display portion. For example, the sub menu display portion 124f shown in FIG. 17 indicates the state that the "A4" input button has been pushed and selected as the parameter value for the size of thick paper and now "entering" is awaited.

Next, the operating procedures other than the above operating procedure in the menu operating method of this embodiment will be described in more detail.

First, selection of set values or initial values for the parameters in the respective setting items will be described.

There is a case where after a copying operation based on some parameter setting is completed, an operator wants to continue the copying operation with directly selecting the parameter value which has been already set (set value). According to the above embodiment, in order to support such a case (selection of a parameter value which has been already set), a continuous copy job button 183 is provided at the right side in the instructing menu display area 180 on the processing end frame 18 displayed after the copying operation is finished (see FIG. 10).

For example, "full color", "A4", "100%" and "10 copies" are set as the parameter values for the indispensable setting items "copy job type", "sheet size", "magnification" and "number of copies" respectively and then the copying operation is carried out. After the copying operation is finished, the processing end frame 18 is displayed.

At this time, on the processing end frame 18 are displayed not only the enter button 184 for clearing the parameter value set, but also the continuous copy job button 183 for instructing continuous execution of a next copying operation by using the parameter value set. When the continuous copy job button 183 is pushed and the copying operation based on the set value is instructed again, the respective parameter values which have been already set are left as they are, and thus set as the parameter values for the respective setting items again in the setting controller 42 of the menu operating controller 40.

Under the state that these set parameter values are kept, the setting frame being displayed is shifted to the final setting frame of the plural setting frames, that is, the number-of-copies setting frame 14 (FIG. 7) corresponding to the display frame just before the processing start frame 16. Here, if it is not required to alter the respective parameter values from the set values, the enter button 144 is pushed to shift to the processing start frame 16 (FIG. 8), the copying operation based on the same set parameter values as the previous copying operation is allowed to be started again.

In addition to the case where the copying operation is continuously carried out with the parameter values which have been already set, there may occurs such a case that the most frequently used parameter values are set as initial values and the operator is allowed to select the setting based on these initial values. According to the above embodiment, in order to support such a case, an initial setting button 113 is provided at the right side in the setting menu display area 110 of the highest (most significant) type setting frame 11 corresponding to the copy job type setting menu (the first setting frame of the plural setting frames) (see FIG. 4).

For example, "full color", "A4", "100%" and "10 copies" are provided as the initial values of the parameter values for the indispensable setting items "copy job type", "sheet size", "magnification" and "number of copies". These initial values are automatically neither selected nor displayed.

At this time, the initial setting button 113 for instructing to carry out the copying operation on the basis of the parameter initial values which are provided in advance is displayed on the type setting frame 11 (first setting frame) in addition to the parameter input buttons 112a to 112f for setting the parameter values for the setting item "copy job type". When the initial setting button 113 is pushed to instruct the copying operation based on the initial values, in the setting controller 42 of the menu operating controller 40, the initial values of the respective parameters are selected as the parameter values and set as the parameter values for the respective setting items.

Under the state that the initial setting values are set as described above, the type setting frame 11 (first setting frame) is immediately shifted to the processing start frame 16 (FIG. 8) which is displayed after the overall setting of the parameters is completed, and the copying operation based on the initial values is allowed to be started.

Figure 19:
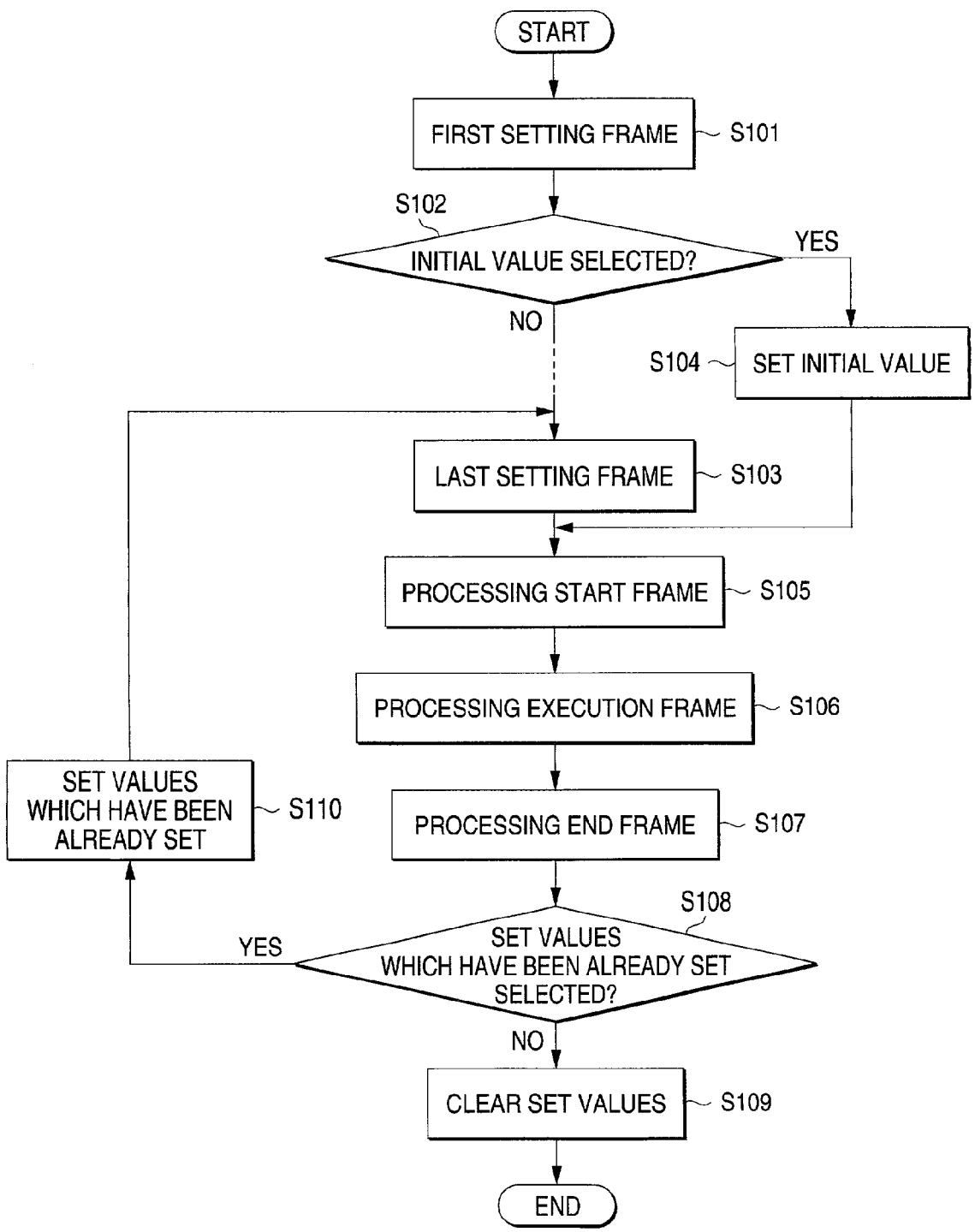
FIG. 19 is a flowchart showing a method of selecting set values or initial (default) values.

Next, the method of selecting the set values or the initial values as described above will be described with reference to the flowchart based on the shift flow of each frame in FIG. 19. First, when the parameter setting for the copying operation is started on the first setting frame (step S101), it is instructed whether the initial values are selected for the parameters (S102).

If the parameter input button is pushed on the first setting frame, the subsequent setting frames are sequentially operated without selecting the initial values, and finally the final setting frame is displayed (S103). After the parameter setting on the final setting frame is completed, the setting frame being displayed is shifted to the processing start frame (S105), and the copying operation is allowed to be started. On the other hand, if the initial setting button is pushed on the first setting frame, the initial values are selected and set as the parameters (S104), and the setting frame being displayed is immediately shifted to the processing start frame (S105).

When the copy job start button is pushed on the processing start frame, the copying operation is started and the processing execution frame is displayed (S106). Thereafter, the copying operation is finished and the processing end frame is displayed (S107).

Next, it is instructed whether the set values (the values which have been already set) are selected as the parameters to perform the copying operation again (S108).

If the enter button for the end of the processing is pushed on the processing end frame, the set values are not selected, but cleared (S109). Thereafter, the copying operation is finished and the processing waits for parameter setting for a next copying operation. On the other hand, if the continuous copy job button is pushed on the processing end frame, the set values are selected and held as the parameters (S110), and the setting frame being displayed is shifted to the final setting frame (S103).

By selecting the set values or the initial values as described above, the set values or the initial values can be set as parameters without operating each setting menu of the hierarchical menu, and thus the operating procedure can be simplified. Further, when the set values are selected, the setting frame being displayed is not directly returned to the processing start frame, but returned to the final setting frame. In this case, the operator is provided with an opportunity of checking the parameter values which have been already set, thereby preventing occurrence of erroneous operations due to erroneous set values. On the other hand, when the initial values are selected, the setting frame being displayed is shifted to the processing start frame. At this time, the operator can immediately instruct to start the processing operation, and thus the labor imposed on the operating procedure can be suppressed at maximum.

Even when the set values or initial values are selected as described above, by pushing each menu item button which has been already set on the number-of-copies setting frame 14 or the processing start frame 16, the setting frame being displayed is returned to the corresponding setting frame to alter some of the set values or initial values.

Next, the display of the copy job type on the processing execution frame will be described.

The processing execution frame 17 of this embodiment is provided with a processing type display window 172 in the instructing menu display area 170 thereof (see FIG. 9). The processing type display window 172 is used to display a processing type identifying image representing a selected one of plural types of image formation. During the execution of the copying operation, the animation corresponding to a copy job type (processing type) set on the type setting menu of the type setting frame 11 is displayed in the processing type display window 172. In FIG. 9, the copy job type during the copying operation being executed is set to "full color processing", and in association with the full color processing, an animation expressing that four color ink pieces are supplied to a sheet is displayed with a full color image.

By providing the processing execution frame 17 with the processing type display window 172 representing the processing type identifying image as described above, the operator can easily visually recognize the copy job type which is selected and executed in the copying operation. For example, when the operator recognizes the set copy job type as being incorrect on the basis of a displayed animation, he/she can immediately push the copy job stop button 174 displayed on the same processing execution frame 17 to forcedly stop the copying operation.

If the copy job type set is "white and black processing", an animation of a white and black image expressing that only one color ink of black is supplied to a sheet is displayed in the processing type display window 172 as shown in FIG. 20. Further, if the copy job type set is "monochromatic color processing", an animation of a monochromatic color image expressing that the corresponding monochromatic color ink is supplied to a sheet is displayed in the processing type display window 172.

The menu operating method, the menu operating device and the image processing apparatus according to the present invention are not limited to the above-described embodiments, and various modifications may be made to these embodiments. Further, the display frames such as the setting frames, etc. to operate the setting menus are not limited to the configurations of the above-described embodiments, and various configurations may be used.

For example, in all the embodiments described above, each of the hierarchical menu display areas is located at the left side of the display frame, however, it may be located at any other place. With respect to the display style of the hierarchical structure of the menu items, various display styles such as numbering of the menu items, linkage of the menu items with arrows, etc. may be used. Further, with respect to the display style of the menu items for which the parameters have been already set, are being set and have not yet been set, they may be displayed in the same display style. Alternatively, the menu items are not displayed with character data, but they may be displayed with identifiable icon images.

Further, various hierarchical structures such as a hierarchical structure in which one setting menu is provided on each layer, such a tree structure which the setting menu is branched, etc. may be used as the hierarchical structure of the hierarchical menus. In the hierarchical menu display area may be displayed the overall operation flow of the hierarchical menu or a partial flow required at each time point.

Various modifications may be made to the operating procedure of each setting menu. For example, "100%" (corresponding to X1 magnification) is normally used for the third setting item "magnification" in the setting items of the five setting menus in the embodiment of the copying machine. Accordingly, it may be modified so that "100%" is set as the initial value of the parameter for only the magnification setting menu in advance, and after the setting of the sheet size on the sheet size setting frame is completed, the initial value of 100% is automatically set for "magnification" and then the setting frame being display is immediately shifted to the number-of-copies setting frame. However, even in this modification, if the "magnification" menu item button is pushed to return to the magnification setting frame, the magnification can be set to values other than 100%.

Further, with respect to "copy job type", when the parameter value "additional print of photograph" is selected or the like, the sheet size and the magnification are required to be fixed to the default values. In this case, it is preferable that the default values for "additional print of photograph" are automatically set for the sheet size and the magnification to prevent these data from being changed. With respect to the parameters which are unchangeable as described above, the parameter values thereof are displayed in a display style different from that of normal ones in the parameter display window within the menu item button, thereby indicating to the operator that these parameters are unchangeable.

In the operating method according to an aspect of the present invention, the operating device according to another aspect of the present invention and the image processing apparatus according to another aspect of the present invention, the setting on plural items is sequentially carried out in predetermined order, and the plural items are displayed when one of plural setting frames is displayed, whereby an operator can obtain information as to the place at which the setting frame being displayed is located in the arrangement of the plural items to be sequentially set. Therefore, the operability an be enhanced.

In the operating method according to another aspect of the present invention and the operating device according to another aspect of the present invention, the items which have been already set, the items which are being set and the items which have not yet been set are displayed to be distinguishable from one another, so that these items can be discriminated from one another.

In the operating method according to another aspect of the present invention and the operating device according to another aspect of the present invention, set values are displayed for items which have been already set, so that the set values can be easily checked.

In the operating method according to another aspect of the present invention and the operating device according to another aspect of the present invention, when one of plural setting frames is displayed, an operation of displaying a setting frame on items which have been already set can be performed, so that the operator can reset these items which have been already set.

In the operating method according to another aspect and the operating device according to another aspect of the present invention, after a setting frame on items which have been already set is displayed and the setting on these items is carried out, the setting frame being displayed is automatically restored to a setting frame displayed before the setting frame on these items is displayed, so that the setting frame being currently displayed can be easily restored to the setting frame previously displayed.

In the operating method according to another aspect and the operating device according to another aspect of the present invention, when the setting frame being displayed is restored to the previously displayed setting frame, the previously set state is maintained, so that the operation can be simplified.

In the operating method according to another aspect, the operating device according to another aspect and the image processing apparatus according to another aspect of the present invention, the operating method is a sequentially setting type operation method, and after the processing operation of the processor is executed on the basis of the content set on plural items, the contents set on the plural items are maintained, so that the operation can be simplified.

In the operating method according to another aspect and the operating device according to another aspect of the present invention, it can be instructed whether the contents set on the plural items are maintained or the contents thus set are cleared after the processing operation of the processor is executed, so that the operator is allowed to select one of the above choices, and the operability is enhanced.

In the operating method according to another aspect and the operating device according to another aspect of the present invention, the operating method is a sequentially setting type operation method, and an instructing unit for instructing all the settings on the plural items to initial settings is allowed to be operated, and thus the operability can be enhanced.

In the operating method according to another aspect and the operating device according to another aspect of the present invention, the instructing unit is displayed on the initial frame, and thus the operability can be enhanced.

The entire disclosure of Japanese Patent Applications Nos. 2000-84974 filed on Mar. 24, 2000 and 2000-85025 filed on Mar. 24, 2000 each including specification, claims, drawings and abstract are incorporated herein by reference in its entirety.

What is claimed is:

1. An operating method for sequentially performing settings for plural items in a predetermined order, the method comprising:

storing plural setting menu display data provided to the respective plural items;

displaying, in a single frame of a display device, the stored plural setting menu display data of plural items to be set;

allowing an operator to input an instruction to perform settings of the plural items through the display device; and performing setting of the plural items in accordance with the inputted instruction; wherein when setting of a first item which is being set is performed based on the inputted instruction, a setting menu display data of a second item that is next to the first item in the predetermined order is displayed, and the first item is displayed as an item which has been already set, an item which has been already set, an item which is being set along with parameters to choose from, and an item which has not yet been set are displayed in the single frame of the display device so as to be distinguishable from one another, an operation of displaying a setting frame for an item which has been already set is allowed to be carried out when one of plural setting frames is displayed, when the setting frame for the item which has been already set is displayed, the setting for the item is carried out, and the setting frame being displayed is automatically restored to a previous setting frame which is displayed just before the setting frame for the item which has been already set is displayed, and when the setting frame is restored to the previous setting frame, a state which has been just previously set is maintained.

2. The operating method as claimed in claim 1, wherein values which have been set are displayed for the item which has been already set.

3. An operating device for sequentially performing settings for plural items in a predetermined order, comprising:

a storage unit that stores plural setting menu display data provided to the respective plural items;

a display unit that displays, in a single frame, the stored plural setting menu display data of plural items to be set;

an input unit that inputs an instruction from an operator to perform settings of the plural items through the display device; and a control unit that that performs setting of the plural items in accordance with the inputted instruction, wherein when setting of a first item which is being set is performed based on the inputted instruction, the display unit displays a setting menu display data of a second item that is next to the first item in the predetermined order, and the first item is displayed as an item which has been already set, an item which has been already set, an item which is being set along with parameters to choose from, and an item which has not yet been set are displayed in the single frame of the display so as to be distinguishable from one another, an operation of displaying a setting frame for an item which has been already set is allowed to be carried out when one of plural setting frames is displayed, when the setting frame for the item which has been already set is displayed, the setting for the item is carried out, and the setting frame being displayed is automatically restored to a previous setting frame which is displayed just before the setting frame for the item which has been already set is displayed, and when the setting frame is restored to the previous setting frame, a state which has been just previously set is maintained.

4. The operating device as claimed in claim 3, wherein values which have been set are displayed for the item which has been already set.

5. An image processing apparatus having an operating device for sequentially performing settings for plural items in a predetermined order, the image processing apparatus comprising:

a storage unit that stores plural setting menu display data provided to the respective plural items; and a display unit that displays, in a single frame, the stored plural setting menu display data of plural items to be set;

an input unit that inputs an instruction from an operator to perform settings of the plural items through the display device; and a control unit that performs setting of the plural items in accordance with the inputted instruction, wherein when setting of a first item which is being set is performed based on the inputted instruction, the display unit displays a setting menu display data of a second item that is next to the first item in the predetermined order, and the first item is turned an item which has been already set, an item which has been already set, an item which is being set along with parameters to choose from, and an item which has not yet been set are displayed in the single frame of the display so as to be distinguishable from one another, an operation of displaying a setting frame for an item which has been already set is allowed to be carried out when one of plural setting frames is displayed, when the setting frame for the item which has been already set is displayed, the setting for the item is carried out, and the setting frame being displayed is automatically restored to a previous setting frame which is displayed just before the setting frame for the item which has been already set is displayed, and when the setting frame is restored to the previous setting frame, a state which has been just previously set is maintained.

6. An operating method for sequentially performing settings for plural items in a predetermined order to perform settings for a processor, the method comprising:

displaying, in a single frame of a display device, all of the plural items and one of plural setting menu display data of plural items to be set;

inputting an instruction from an operator to perform settings of the plural items through the display device;

setting the plural items in accordance with the inputted instruction;

carrying out a processing operation of the processor on the basis of contents set for the plural items; and maintaining the contents set for the plural items; wherein when setting of a first item which is being set is performed based on the inputted instruction, the display unit displays a setting menu display data of a second item that is next to the first item in the predetermined order, and the first item is displayed as an item which has been already set, an item which has been already set, an item which is being set along with parameters to choose from, and an item which has not yet been set are displayed in the single frame of the display device so as to be distinguishable from one another, an operation of displaying a setting frame for an item which has been already set is allowed to be carried out when one of plural setting frames is displayed, when the setting frame for the item which has been already set is displayed, the setting for the item is carried out, and the setting frame being displayed are automatically restored to a previous setting frame which is displayed just before the setting frame for the item which has been already set is displayed, and when the setting frame is restored to the previous setting frame, a state which has been just previously set is maintained.

7. The operating method as claimed in claim 6, wherein after the processing operation of the processor is executed, an instruction can be provided as to whether the contents set for the plural items are maintained or the contents set are cleared.

8. An operating method for sequentially performing settings for plural items in a predetermined order to perform the setting for a processor, the method comprising:

enabling provision of instruction by a user for all the settings for the plural items to be initial settings;

setting the plural items in accordance with the provided instruction; and displaying, in a single frame of a display device, all of the plural items and one of plural setting frames provided to the plural items, wherein when setting of a first item which is being set is performed based on the inputted instructions, the display unit displays a setting frame of a second item that is next to the first item in the predetermined order, and the first item is displayed as an item which has been already set, an item which has been already set, an item which is being set along with parameters to choose from, and an item which has not yet been set are displayed in the single frame so as to be distinguishable from one another, an operation of displaying a setting frame for an item which has been already set is allowed to be carried out when one of the plural setting frames is displayed, when the setting frame for the item which has been already set is displayed, the setting for the item is carried out, and the setting frame being displayed are automatically restored to a previous setting frame which is displayed just before the setting frame for the item which has been already set is displayed, and when the setting frame is restored to the previous setting frame, a state which has been just previously set is maintained.

9. The operating method as claimed in claim 8, wherein the instruction is provided on an initial frame.

* * * * *